United States Patent
Gondal et al.

(10) Patent No.: US 11,651,907 B1
(45) Date of Patent: May 16, 2023

(54) FABRICATION OF MAGNETIC SUPERCAPACITOR DEVICE USING SELF-SYNTHESIZED MAGNETIC NANOCRYSTALS VIA FACILE SOL-GEL METHOD

(71) Applicant: KING FAHD UNIVERSITY OF PETROLEUM AND MINERALS, Dhahran (SA)

(72) Inventors: Muhammad A. Gondal, Dhahran (SA); Muhammad Hassan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/832,025

(22) Filed: Jun. 3, 2022

(51) Int. Cl.
*H01G 11/32* (2013.01)
*C01G 53/00* (2006.01)
(Continued)

(52) U.S. Cl.
CPC ............ *H01G 11/32* (2013.01); *C01G 53/40* (2013.01); *H01G 11/10* (2013.01); *H01G 11/26* (2013.01);
(Continued)

(58) Field of Classification Search
CPC .......... B01J 23/005; B01J 23/10; B01J 23/83; H01G 11/32; H01G 11/10; H01G 11/26;
(Continued)

(56) References Cited

U.S. PATENT DOCUMENTS 10,770,755 B2   9/2020   Zhamu et al.

FOREIGN PATENT DOCUMENTS

KR    10-2173006 B1    11/2020
MY       181668 A      12/2020
(Continued)

OTHER PUBLICATIONS

Nicolae Rezlescu et al., "Scandium substituted nickel-cobalt ferrite nanoparticles for catalyst applications." Applied Catalysis B: Environmental 158-159, pp. 70-75. (Year: 2014).*
(Continued)

*Primary Examiner* — Patricia L. Hailey
(74) *Attorney, Agent, or Firm* — Oblon, McClelland, Maier & Neustadt, L.L.P.

(57) ABSTRACT

Aspects of the present disclosure are directed towards a method of making a scandium metal-doped nanoparticle. The method includes mixing a cobalt salt, an iron salt, and an acid in water to form a solution including $CoFe_2O_4$; mixing a nickel-iron oxide solution and a scandium oxide solution to form a solution including $NiSc_{0.03}Fe_{1.97}O_4$; mixing the cobalt iron oxide solution and the nickel scandium iron oxide solution to form a sol-gel mixture including $CoFe_2O_4/(NiSc_{0.03}Fe_{1.97}O_4)_x$ ($0 \leq x \leq 5$); adjusting the pH of the sol-gel mixture 6 to 8 with a base to form a first mixture; heating the first mixture to form a powder, and calcining the powder to form the scandium metal-doped nanoparticle of formula $CoFe_2O_4/(NiSc_{0.03}Fe_{1.97}O_4)_x$ ($0 \leq x \leq 5$). The present disclosure also describes an electrode including the scandium metal-doped nanoparticles. The electrode may be used in magnetic supercapacitors.

5 Claims, 19 Drawing Sheets

(51) Int. Cl.
*H01G 11/26* (2013.01)
*H01G 11/10* (2013.01)

(52) U.S. Cl.
CPC ...... *C01P 2002/72* (2013.01); *C01P 2002/85* (2013.01); *C01P 2004/03* (2013.01); *C01P 2004/04* (2013.01); *C01P 2004/50* (2013.01); *C01P 2004/62* (2013.01); *C01P 2004/64* (2013.01); *C01P 2004/84* (2013.01); *C01P 2006/40* (2013.01)

(58) Field of Classification Search
CPC .. C01G 53/40; C01P 2002/72; C01P 2002/85; C01P 2004/03; C01P 2004/04; C01P 2004/50; C01P 2004/62; C01P 2004/64; C01P 2004/84; C01P 2006/40
USPC ........... 502/101, 302, 335, 336, 524; 420/83
See application file for complete search history.

(56) References Cited

FOREIGN PATENT DOCUMENTS

| | | | | |
|---|---|---|---|---|
| WO | WO 2005/081667 A2 | 9/2005 | | |
| WO | WO 2005/081667 A3 | 9/2005 | | |
| WO | WO-2007098111 A2 | * 8/2007 | ............ | B22F 1/0018 |

OTHER PUBLICATIONS

M. A. Almessiere et al., "Investigation on electrical and dielectric properties of hard/soft spinel ferrite nanocomposites of CoFe@O4/NiSc0.03Fe1.97O4)x." Vacuum 194, pp. 1-12. (Year: 2021).*

Munirah Abdullah Almessiere, et al., "Investigation of hard/soft $CoFe_2O_4/NiSc_{0.03}Fe_{1.97}O_4$ nanocomposite for energy storage applications", International Journal of Energy Research, vol. 45, Issue 11, Jun. 5, 2021, pp. 16691-16708 (Abstract only).

Nicolae Rezlescu, et al., "Scandium substituted nickel-cobalt ferrite nanoparticles for catalyst applications", Applied Catalysis B: Environmental, vols. 158-159, Oct. 2014, pp. 70-75 (Abstract only).

M.H. Rashid, et al., "Structural, morphological and electromagnetic properties of $Sc^{3+}$ doped Ni—Cu—Zn ferrites", Results in Physics, vol. 11, 2018, pp. 888-895.

Dhiraj Sud, "Sol-gel synthesis of transition metal oxides based electrode materials for supercapacitors", Nanocomposites for Electrochemical Capacitors, Chapter 7, Jan. 15, 2018, pp. 155-185 (Abstract only).

* cited by examiner

FABRICATION OF MAGNETIC SUPERCAPACITOR DEVICE USING SELF-SYNTHESIZED MAGNETIC NANOCRYSTALS VIA FACILE SOL-GEL METHOD

STATEMENT OF PRIOR DISCLOSURE BY THE INVENTOR

Aspects of the present disclosure are described in M. A. Almessiere; "Investigation of hard/soft $CoFe_2O_4$/$NiSc_{0.03}Fe_{1.97}O_4$ nanocomposite for energy storage applications"; Jun. 5, 2021; International Journal of Energy Research, incorporated herein by reference in its entirety.

BACKGROUND

Technical Field

The present disclosure is directed to magnetic nanomaterials, and particularly to scandium metal-doped nanoparticles for use in supercapacitors.

Description of Related Art

The "background" description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present invention.

Transition metal oxides are being used for several research applications including solar cells, biosensors, photocatalysts, and energy storage devices. Among these metal oxides, spinel ferrites $MFe_2O_4$ (M=Fe, Cu, Ni, Co, etc.) are a fascinating class of materials because of their promising applications in gas sensing, microwave absorbers, media storage devices, transformer cores, drug delivery, and electrochemical supercapacitors. Spinel ferrites have a face-centered cubic (FCC) structure with oxygen as anion and metal as a cation. The electric, electromagnetic and optical characteristics of the metal ferrites are contingent on the synthesis method, cation substitution, and elemental composition.

In recent years, numerous methods have been directed to synthesize single and mixed metal ferrites to enhance their unique properties and make them cost-effective replacements for noble metals. Spinel ferrites consisting of a combination of two divalent metal ions are referred to as mixed ferrites. The surface features of the mixed ferrites are impacted by the cationic distribution between tetrahedral (Td) and octahedral sites (Oh). Cobalt and nickel oxides are well-known catalysts as well as highly efficient energy storage materials. Although the ferrites of these metals exhibit high specific capacitance owing to their various oxidation states, they suffer from poor cycling stability. Therefore, it is one object to the present disclosure to provide a method for preparing mixed ferrites that may overcome the limitations of the art.

SUMMARY

In an exemplary embodiment, a method of making a scandium metal-doped nanoparticle is described. The method includes mixing a cobalt salt, an iron salt, and an acid in water to form a solution including $CoFe_2O_4$; mixing a nickel-iron oxide solution and a scandium oxide solution to form a solution including $NiSc_{0.03}Fe_{1.97}O_4$; mixing the cobalt iron oxide solution and the nickel scandium iron oxide solution to form a sol-gel mixture including $CoFe_2O_4$/$(NiSc_{0.03}Fe_{1.97}O_4)_x$ $(0 \leq x \leq 5)$; adjusting the pH of the sol-gel mixture 6 to 8 with a base to form a first mixture; heating the first mixture to form a powder, and calcining the powder to form the scandium metal-doped nanoparticle of formula $CoFe_2O_4$/$(NiSc_{0.03}Fe_{1.97}O_4)_x$ $(0 \leq x \leq 5)$.

In some embodiments, the scandium metal-doped nanoparticle has a substantially spherical shape, an average size of 5-200 nanometers (nm), and aggregated to form aggregates having a size of at least 20 nm.

In some embodiments, the scandium metal-doped nanoparticle comprises 15-30 wt. % oxygen, 0.1-2 wt. % scandium, 35-45 wt. % iron, 12-25 wt. % cobalt, and 12-25 wt. % nickel, based on the total weight of the oxygen, scandium, iron, cobalt, and nickel.

In some embodiments, the method includes calcining the powder at 700 to 950° C. for 3 to 10 hours to form the scandium metal-doped nanoparticle of formula $CoFe_2O_4$/$(NiSc_{0.03}Fe_{1.97}O_4)_x$ $(0 \leq x \leq 5)$.

In some embodiments, an electrode including the scandium metal-doped nanoparticles is described. The electrode includes a substrate; at least one binding compound; at least one carbonaceous compound; and the scandium metal-doped nanoparticles; where the substrate is at least partially coated on a first side with a mixture including the scandium metal-doped nanoparticles, the at least one binding compound, and the at least one carbonaceous compound.

In some embodiments, the mixture includes 1-20 wt. % of the scandium metal-doped nanoparticles; 80-99 wt. % of the binding compound, and the carbonaceous compound based on the total weight of the scandium metal-doped nanoparticles, the binding compound, and the carbonaceous compound.

In some embodiments, the binding compound is at least one selected from the group consisting of polyvinylidene fluoride, and N-methyl pyrrolidone.

In some embodiments, the electrode substrate is made from at least one of the materials selected from the group consisting of stainless steel, aluminum, nickel, copper, platinum, zinc, tungsten, and titanium.

In some embodiments, the conductive carbonaceous material compound is at least one selected from the group consisting of graphite, activated carbon, reduced graphene oxide, carbon nanotubes, carbon nanofibers, and carbon black.

In an exemplary embodiment, a method to make the electrode is described. The method includes mixing the binding compound and the carbonaceous compound for 1-4 hours at a temperature of 50-70° C. to form a paste; adding 1-20 wt. % of the scandium metal-doped nanoparticles, based on the total weight of the binding compound, the carbonaceous compound, and the scandium metal-doped nanoparticles, into the paste and sonicating for 10-30 minutes creating a mixture; coating the mixture onto the substrate to form the electrode, and drying the electrode at a temperature less than 100° C.

In an exemplary embodiment, a magnetic supercapacitor including the electrode is described. The magnetic supercapacitor further includes a separator, and at least one electrolyte; where two of the electrodes form a layered structure with the first sides of the substrates facing inward and at least one second side of the substrates not coated with the mixture facing outward; and where the at least one electrolyte and the separator are between and in direct contact with the first sides of the electrodes to form the supercapacitor.

In some embodiments, the separator is selected from a group consisting of a polypropylene membrane, a glass fiber membrane, and a cellulose fiber membrane.

In some embodiments, the electrolyte is at least one selected from a group consisting of a hydrogen halide, sulfuric acid, nitric acid, perchloric acid, chloric acid, an alkali metal salt, and an alkaline earth salt. In some examples, the electrolyte has a molarity of 1-10 in water.

In some embodiments, the magnetic supercapacitor has a power density of 560 to 630 W/kg.

In some embodiments, the magnetic supercapacitor has an energy density of 23 to 44 Wh/kg.

In some embodiments, at least 90% of the initial specific capacitance is maintained after 2,000 to 4000 charge-discharge cycles.

In an exemplary embodiment, a wearable device including the supercapacitor is described. The wearable device includes a supercapacitor that is electrically connected to a sensor, and the supercapacitor functions as a battery The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
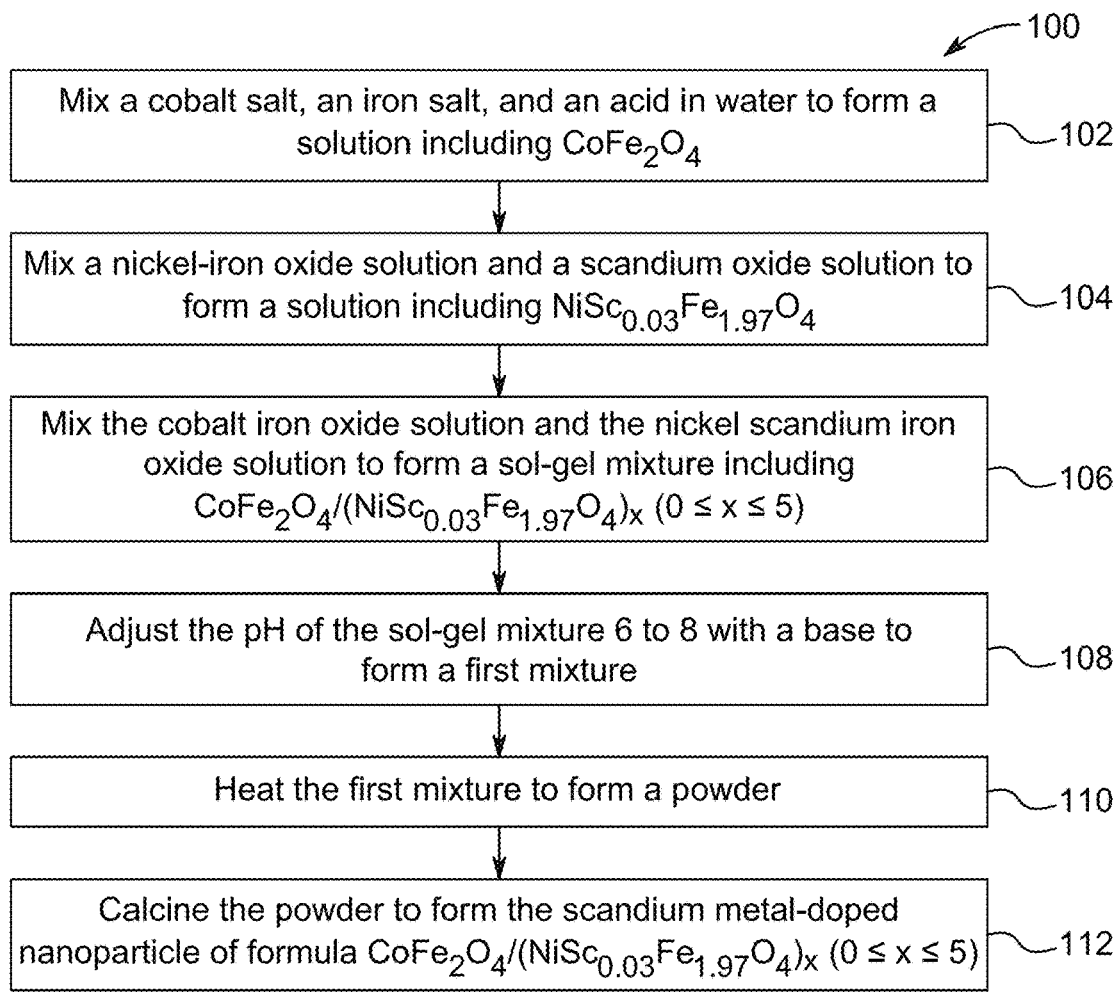
FIG. 1A is a flow chart depicting a method of making a scandium metal-doped nanoparticle, according to certain embodiments.

The present disclosure will be better understood with reference to the following definitions.

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

In the drawings, like reference numerals designate identical or corresponding parts throughout the several views. Further, as used herein, the words "a," "an" and the like generally carry a meaning of "one or more," unless stated otherwise. Also, the use of "or" means "and/or" unless stated otherwise. Similarly, "comprise," "comprises," "comprising," "include," "includes," and "includin," are interchangeable and not intended to be limiting.

Furthermore, the terms "approximately," "approximate," "about," and similar terms generally refer to ranges that include the identified value within a margin of 20%, 10%, or preferably 5%, and any values there between. For example, if a stated value is about 8.0, the value may vary in the range of ±1.6, ±1.0, ±0.8, ±0.5, ±0.4, ±0.3, ±0.2, or ±0.1.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z.

Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology.

The present disclosure includes all hydration states of a given compound or formula, unless otherwise noted or when heating a material.

A magnetic supercapacitor is fabricated using a mixture of hard and soft magnetic nanocrystals at different concentrations. The hard/soft magnetic nanocrystals CoFe$_2$O$_4$/ NiFe$_2$O$_4$ were synthesized using a novel auto-combustion sol-gel method. The soft part of the mixture was further doped with scandium metal CoFe$_2$O$_4$/(NiSc$_{0.03}$Fe$_{1.97}$O$_4$)$_x$ (0≤x≤5) at a varying concentration to enhance the magnetic properties of the nanocomposite. The structure and morphology of the synthesized nanocomposite were studied using X-ray diffraction (XRD), transmission electron microscopy (TEM), and field emission scanning electron microscopy (FESEM). The magnetic properties of the synthesized nanocrystals were investigated at two different temperatures i.e., 300 K and 10 K. The results indicate that the magnetic nanocomposite prepared through a sol-gel technique exhibited smoothed magnetic hysteresis (M-H) loops at both temperatures. As used herein, the term "sol-gel technique" refers to a wet chemical technique also known as chemical solution deposition. The sol-gel technique may also be considered "one pot" in that the precursors are mixed and then combined into a single reaction vessel for the chemical solution deposition. Additionally, the plots of switching field distribution (SDF) indicated the manifestation of a single peak in dM/dH versus H plots verifying the superiority of the synthesis method used in the present disclosure.

Compared to the CFO product (x=0), i.e., CoFe$_2$O$_4$, the initial introduction of the soft NSFO phase ((NiSc$_{0.03}$Fe$_{1.97}$O$_4$)$_x$) of a mass ratio x=1, within the hard-soft nanocomposites, showed an enhancement in various magnetic parameters such as saturation magnetization (Ms), remanent magnetization (Mr), and coercive field (Hc) values. As used herein, the term "CFO" refers to cobalt iron oxide. As used herein, the term "NSFO" nickel scandium iron oxide. These magnetic parameters showed a reduction tendency with a further rise in the volume fraction of soft ferrite (x). Further, the synthesized magnetic nanocrystals were used as electrode material for the fabrication of magnetic supercapacitors. The electrochemical properties of the supercapacitors were studied using cyclic voltammetry (CV), galvanostatic charge-discharge (GCD), and electrochemical impedance spectroscopy (EIS). The results indicate that the supercapacitor fabricated from CFO-xNSFO for x=2 showed the best performance in terms of specific capacitance with 150 to 250 F $g^{-1}$, preferably 180 to 230 F $g^{-1}$, preferably 200 to 230 F $g^{-1}$, preferably 204.4 F $g^{-1}$ at a scan rate of 5 to 20 mV $s^{-1}$, preferably 8 to 15 mV $s^{-1}$, preferably 10 to 15 mV $s^{-1}$, preferably 10 mV $s^{-1}$. The working of the supercapacitor was further tested for a higher potential window of 0.8 to 1.8 V, preferably 1.0 to 1.5 V, preferably 1.2 V, where a specific energy value of 25 to 50 Wh $kg^{-1}$, preferably 28 to 40 Wh $kg^{-1}$, preferably 30 to 35 Wh $kg^{-1}$, preferably 33.2 Wh $kg^{-1}$ was achieved, which is a direct 100 to 200%, preferably 100 to 150%, preferably 120 to 150%, preferably 144% and 100 to 250%, preferably 150 to 200%, preferably 187% enhancement from the same supercapacitor working at 0.5 to 1.2 V, preferably 0.8 to 1.0 V, preferably 0.8 V and from the reference carbon-based supercapacitor respectively. The device also displayed excellent stability when tested through 2000 to 7000 charge-discharge cycles, preferably 3000 to 6000 charge-discharge cycles, preferably 4000 to 5000 charge-discharge cycles, preferably 5000 charge-discharge cycles.

Figure 1B:
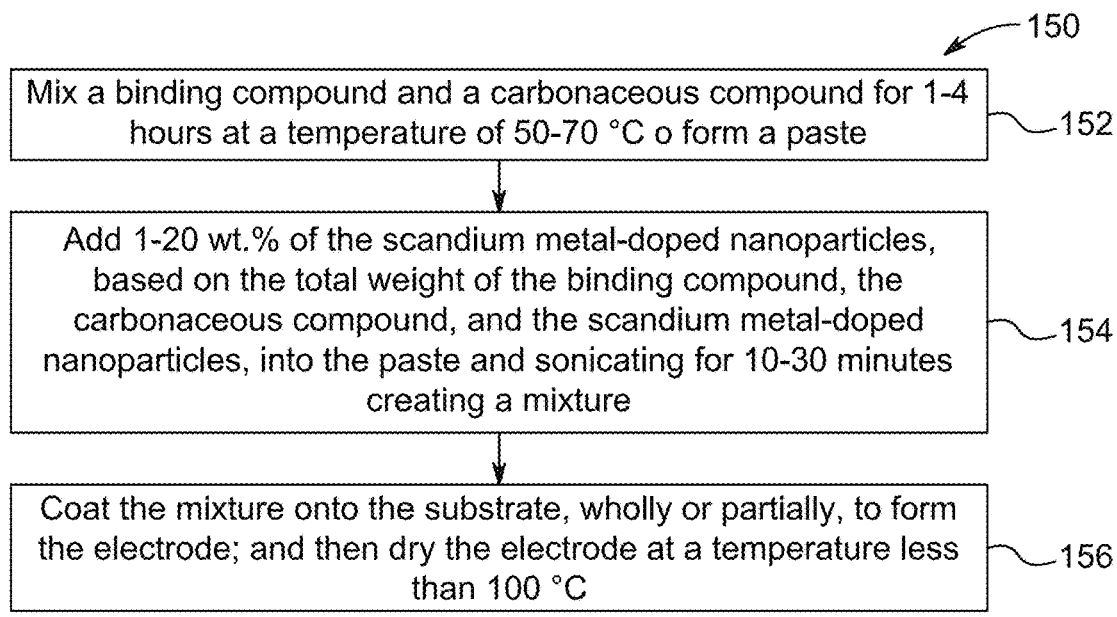
FIG. 1B is a flow chart depicting a method of making an electrode including the scandium metal-doped nanoparticles or "nanoparticles", according to certain embodiments.
Figure 2C:
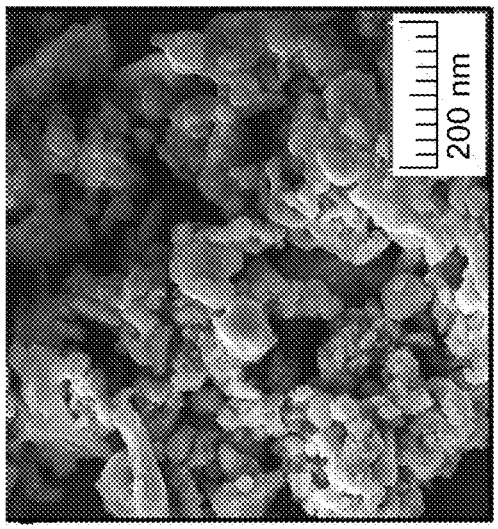
FIG. 2C illustrates SEM image of $CoFe_2O/(NiSc_{0.03}Fe_{1.97}O_4)_3$ nanocrystals, according to certain embodiments.
Figure 2B:
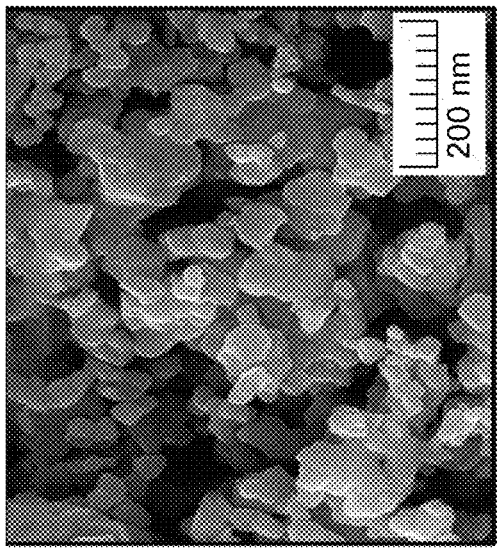
FIG. 2B illustrates SEM image of $CoFe_2O/(NiSc_{0.03}Fe_{1.97}O_4)_2$ nanocrystals, according to certain embodiments.
Figure 2A:
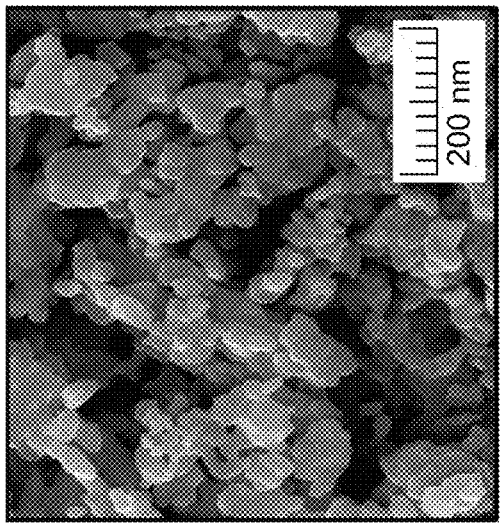
FIG. 2A illustrates a scanning electron microscope (SEM) image of $CoFe_2O_4/(NiSc_{0.03}Fe_{1.97}O_4)$ nanocrystals, according to certain embodiments.
Figure 2E:
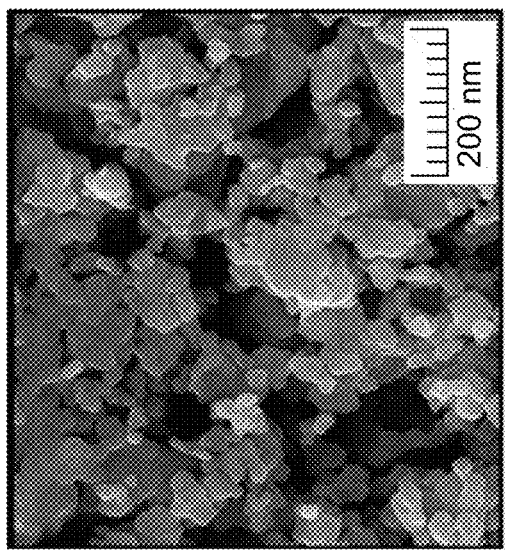
FIG. 2E illustrates SEM image of $CoFe_2O/(NiSc_{0.03}Fe_{1.97}O_4)_5$ nanocrystals, according to certain embodiments.
Figure 2D:
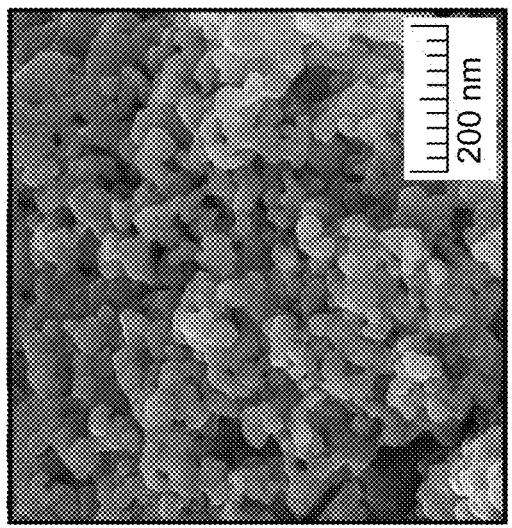
FIG. 2D illustrates SEM image of $CoFe_2O/(NiSc_{0.03}Fe_{1.97}O_4)_4$ nanocrystals, according to certain embodiments.

Referring to FIG. 1, a schematic flow diagram of the method of making scandium metal-doped nanoparticles is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes mixing a cobalt salt, an iron salt, and an acid in water to form a solution including $CoFe_2O_4$. In an embodiment, the cobalt salt includes cobalt (II) salts such as cobalt sulfate, cobalt chloride, cobalt nitrate, cobalt acetate, cobalt carbonate, cobalt phosphate, or any combinations thereof. In an embodiment, the cobalt salt is $Co(NO_3)_2$. In some embodiments, the iron salt is iron sulfate, iron hydrate, or any other iron salts known in the art. In a preferred embodiment, the iron salt is $Fe(NO_3)_3 \cdot 9H_2O$. In an embodiment, the acid is citric acid. Exemplary of organic acids that maybe used include acetic acid, formic acid, tartaric acid, malic acid, uric acid, oxalic acid, etc. In an embodiment, the method includes mixing $Co(NO_3)_2$, $Fe(NO_3)_3 \cdot 9H_2O$, and $C_6H_8O_7$ in water preferably with stirring at 50 to 150° C., preferably 60 to 120° C., preferably 70 to 100° C., preferably 80° C. for 20 to 70 min, preferably 30 to 60 min, preferably 40 to 50 min, preferably 40 min to obtain a $CoFe_2O_4$ solution.

At step 104, the method includes mixing a nickel-iron oxide solution and a scandium oxide solution to form a solution including $NiSc_{0.03}Fe_{1.97}O_4$.

At step 106, the method 100 includes mixing the cobalt iron oxide solution and the nickel scandium iron oxide solution to form a sol-gel mixture including $CoFe_2O_4/(NiSc_{0.03}Fe_{1.97}O_4)$, ($0 \leq x \leq 5$). In other words, the nanocrystals were mixed in different concentrations of doping atoms and a composite of hard/soft magnetic nanocrystals was obtained using the sol-gel auto-combustion technique. For example, mixing cobalt iron oxide solution and the nickel scandium iron oxide solution at a molar ratio of 1:2 yielded $CoFe_2O_4/(NiSc_{0.03}Fe_{1.97}O_4)_2$.

At step 108, the method 100 includes adjusting the pH of the sol-gel mixture 6 to 8 with a base to form a first mixture. In an embodiment, the pH of the sol-gel mixture was adjusted to 7 using a base. In some embodiment, the base that maybe used include an ammonium solution, ammonium hydroxide, lithium hydroxide, potassium hydroxide, rubidium hydroxide, cesium hydroxide, calcium hydroxide, strontium hydroxide, barium hydroxide, sodium hydride, sodium 20 hydroxide, etc.

At step 110, the method 100 includes heating the first mixture to form a powder. In an embodiment, the first mixture is heated to a temperature range of 50 to 700° C., preferably 80 to 650° C., preferably 90 to 600° C., preferably 100 to 550° C., preferably 100 to 500° C., preferably 100 to 450° C. In some embodiments, the first mixture was heated to 100 to 200° C., preferably 130 to 180° C., preferably 150 to 170° C., preferably 160° C. for 10 to 120 minutes, preferably 30 to 100 minutes, preferably 50 to 80 minutes, preferably 50 minutes and further raised to 200 to 450° C., preferably 250 to 420° C., preferably 300 to 400° C., preferably 350 to 390° C., preferably 380° C. to form a black powder.

At step 112, the method 100 includes calcining the powder to form the scandium metal-doped nanoparticle of formula $CoFe_2O_4/(NiSc_{0.03}Fe_{1.97}O_4)_x$ ($0 \leq x \leq 5$). In some embodiments, the powder is calcined at 600 to 1200° C., preferably 700 to 1100° C., preferably 700 to 1000° C., preferably 700 to 950° C. for 1 to 15 hours, preferably 2 to 13 hours, preferably 3 to 12 hours, preferably 3 to 10 hours. In a preferred embodiment, the powder was calcined at 700-900° C., preferably 800-880° C., preferably 820-850° C., preferably 850° C. for 2-10 hours, preferably 2-8 hours, preferably 4-8 hours, preferably 6 hours. Preferably the powder was calcined in the presence of oxygen, alternately the powder is calcined in an inert atmosphere such as nitrogen or argon gas. In some embodiments, the scandium metal-doped nanoparticle has a substantially spherical shape, an average size of 1-400 nm, preferably 3-300 nm, preferably 4-250 nm, preferably 5-200 nm, and aggregated to form aggregates having a size of at least 10 to 40 nm, preferably 15 to 30 nm, preferably 20 to 30 nm, preferably 20 nm. In some embodiments, the scandium metal-doped nanoparticle includes 10-40 wt. %, preferably 15-35 wt. %, preferably 15-30 wt. % oxygen, 0.05-5 wt. %, preferably 0.1-4 wt. %, preferably 0.1-3 wt. %, preferably 0.1-2 wt. % scandium, 30-50 wt. %, preferably 33-48 wt. %, preferably 35-45 wt. % iron, 10-30 wt. %, preferably 10-25 wt. %, preferably 12-25 wt. % cobalt, and 10-30 wt. %, preferably 11-29 wt. %, preferably 12-27 wt. %, preferably 12-25 wt. % nickel, based on the total weight of the oxygen, scandium, iron, cobalt, and nickel.

In some embodiments, the scandium metal-doped nanoparticle of formula $CoFe_2O_4/(NiSc_{0.03}Fe_{1.97}O_4)$ ($0 \leq x \leq 5$) may be used in an electrode. The electrode may include a substrate; at least one binding compound; at least one carbonaceous compound; and scandium metal-doped nanoparticles. In an embodiment, the electrode substrate is made from at least one of the materials selected from the group consisting of stainless steel, aluminum, nickel, copper, platinum, zinc, tungsten, and titanium; the binding compound is at least one selected from the group consisting of polyvinylidene fluoride, and N-methyl pyrrolidone; and the conductive carbonaceous material compound is at least one selected from the group consisting of graphite, activated carbon, reduced graphene oxide, carbon nanotubes, carbon nanofibers, and carbon black. In a preferred embodiment, the electrode substrate is aluminum; the binding compound is polyvinylidene fluoride, the binder is N-methyl-2-pyrrolidone solvent; and the conductive carbonaceous material compound is activated carbon. In an embodiment, the substrate is at least partially coated on a first side with a mixture including the scandium metal-doped nanoparticles, at least one binding compound, and at least one carbonaceous compound. In an embodiment, the substrate is wholly coated on the first side with the mixture. In one embodiment, the mixture includes 1-40 wt. %, preferably 1-35 wt. %, preferably 1-30 wt. %, preferably 1-25 wt. %, preferably 1-20 wt. % of the scandium metal-doped nanoparticles. In one embodiment, the mixture includes 1-40 wt. %, preferably 1-35 wt. %, preferably 1-30 wt. %, preferably 1-25 wt. %, preferably 1-20 wt. % of the binding compound. In one embodiment, the mixture includes 1-40 wt. %, preferably 1-35 wt. %, preferably 1-30 wt. %, preferably 1-25 wt. %, preferably 1-20 wt. % of the carbonaceous compound. The coating of the scandium metal-doped nanoparticles on the metallic substrate enhances the surface area of the electrode, allowing for increased reaction efficiency. The dispersion of the nanoparticle on the substrate may be accomplished by a variety of methods, including but not limited to painting, spraying, screen printing, or any other methods known in the art. Optionally, the electrode may be subjected to a heat treatment at a temperature range of 300-1500° C., preferably 300-1200° C., preferably 300-1000° C., preferably 400-1000° C., preferably 500-1000° C. to sinter the nanoparticles together to provide structural integrity.

Aspects of the present disclosure are also directed to a method of making the electrode including the scandium metal-doped nanoparticles. The order in which the method 150 is described is not intended to be construed as a limitation, and any number of the described method steps may be combined in any order to implement the method 150. Additionally, individual steps may be removed or skipped from the method 150 without departing from the spirit and scope of the present disclosure.

At step 152, the method 150 includes mixing the binding compound and the carbonaceous compound for 1-8 hours, preferably 1-6 hours, preferably 1-5 hours, preferably 1-4 hours at a temperature of 30-110° C., preferably 40-100° C., preferably 50-90° C., preferably 50-80° C., preferably 50-70° C. to form a paste. In an embodiment, the binding compound is at least one selected from the group consisting of polyvinylidene fluoride, and N-methyl pyrrolidone; and the conductive carbonaceous material compound is at least one selected from the group consisting of graphite, activated carbon, reduced graphene oxide, carbon nanotubes, carbon nanofibers, and carbon black. In a preferred embodiment, the binding compound is polyvinylidene fluoride, and the conductive carbonaceous material is activated carbon.

At step 154, the method 150 includes adding 1-40 wt. %, preferably 1-35 wt. %, preferably 1-33 wt. %, preferably 1-30 wt. %, preferably 1-25 wt. %, preferably 1-22 wt. %, preferably 1-20 wt. % of the scandium metal-doped nanoparticles, based on the total weight of the binding compound, the carbonaceous compound, and the scandium metal-doped nanoparticles, into the paste and sonicating for 10-100 minutes, preferably 10-80 minutes, preferably 10-60 minutes, preferably 10-40 minutes, preferably 10-30 minutes creating a mixture.

At step 156, the method 100 includes coating the mixture onto the substrate, wholly or partially, to form the electrode; and then drying the electrode at a temperature less than 100° C. These electrodes may provide both a cost and performance improvement compared to traditional electrodes in electrochemical systems. The nanoparticle-coated electrodes described herein can be applied to a variety of electrochemical devices, including a hydrogen generating electrode in a water electrolyzer system or a fuel cell.

A magnetic supercapacitor (herein referred to as "supercapacitor") including the electrode is described. The supercapacitor includes a separator; and at least one electrolyte. In an embodiment, the separator is soaked in the electrolyte. In some embodiments, the separator is selected from a group consisting of a polypropylene membrane, a glass fiber membrane, and a cellulose fiber membrane; wherein the membrane is porous having a pore size of 0.10 to 7 µm, preferably 0.5 to 5 µm or 1 to 2 µm with thickness of 100 to 150 µm preferably 120 to 140 µm or about 125 µm; the electrolyte is at least one selected from a group consisting of a hydrogen halide, sulfuric acid, nitric acid, perchloric acid, chloric acid, an alkali metal salt, and an alkaline earth salt, wherein the electrolyte has a molarity of 1-20, preferably 1-15, preferably 1-14, preferably 1-13, preferably 1-12, preferably 1-10 in water.

The supercapacitor including the electrode is positioned in such as manner where two of the electrodes form a layered structure with the first sides of the substrates facing inward and at least one second side of the substrates not coated with the mixture facing outward. At least one electrolyte and the separator are positioned between and in direct contact with the first sides of the electrodes to form the supercapacitor.

The supercapacitor preferably has a power density of 500 to 700 W/kg, preferably 510 to 690 W/kg, preferably 520 to 680 W/kg, preferably 530 to 670 W/kg, preferably 540 to 660 W/kg, preferably 550 to 650 W/kg, preferably 560 to 630 W/kg, to an energy density of 10 to 60 Wh/kg, preferably 13 to 55 Wh/kg, preferably 15 to 50 Wh/kg, preferably 18 to 45 Wh/kg, preferably 20 to 44 Wh/kg, preferably 23 to 44 Wh/kg, and where at least 70 to 95%, preferably 75 to 92%, preferably 80 to 90%, preferably 85 to 90%, preferably 87 to 90%, preferably 88 to 90% of the initial specific capacitance is maintained after 1000 to 8000 charge-discharge cycles, preferably 1000 to 6000 charge-discharge cycles, preferably 1000 to 4000 charge-discharge cycles, preferably 2000 to 4000 charge-discharge cycles.

A wearable device including the supercapacitor is described. The supercapacitor is electrically connected to a sensor, and the supercapacitor functions like a battery. In some embodiments, 2 to 10 of the supercapacitor may be connected in parallel and/or in series.

A light-emitting diode device including the supercapacitor is described. The supercapacitor is electrically connected to a light-emitting diode, and the supercapacitor functions like a battery.

EXAMPLES

The following examples describe and demonstrate exemplary embodiments of the method of making a scandium metal-doped nanoparticle for use in an electrode. The examples are provided solely for illustration and are not to be construed as limitations of the present disclosure, as many variations thereof are possible without departing from the spirit and scope of the present disclosure.

Example 1: Synthesis and Characterization of Hard/Soft Magnetic Nanocrystals

Cobalt ferrite ($CoFe_2O_4$) and Sc doped nickel ferrite ($NiSc_{0.03}Fe_{1.97}O_4$) magnetic nanocrystals were synthesized using the one-pot sol-gel auto-combustion method. Further, these nanocrystals were mixed in different concentrations of doping atoms, and a composite of hard/soft magnetic nanocrystals was obtained using the same sol-gel auto-combustion technique. For this purpose, $Co(NO_3)_2$, $Fe(NO_3)_3.9H_2O$, and $C_6H_8O_7$ were mixed in 50 ml DI water with constant stirring at 80° C. for 40 minutes to obtain a $CoFe_2O_4$ solution. In order to obtain $NiSc_{0.03}Fe_{1.97}O_4$, an appropriate weight of $Sc_2O_3$ is dissolved in a 15 ml acid solution containing HCl at 180-200° C. under stirring until a transparent solution was obtained. The $Sc_2O_3$ solution was added to metal nitrates (i.e., $Ni(NO_3)_2.6H_2O$, $Fe(NO_3)_3.9H_2O$ in $C_6H_8O_7$) in 80 ml of DI water. The pH of the solution was adjusted to 7 using ammonium solution at 160° C. for 50 minutes then raised to 380° C. to form a black powder which was calcined at 850° C. for 6 hours.

All fractions of hard/soft $CoFe_2O/NiSc_{0.03}Fe_{1.97}O_4$ nanocomposites were prepared by mixing both $CoFe_2O_4$ and $NiSc_{0.03}Fe_{1.97}O_4$ solutions at a regulated pH of 7 and following the same procedure as explained above for individual metal ferrites. The morphology of the synthesized nanocomposite was obtained through FE-SEM (Lyra3, Tescan, Brno, Czech Republic) connected (EDX) energy-dispersive X-ray and presented in (FIG. 2).

Figure 3A:
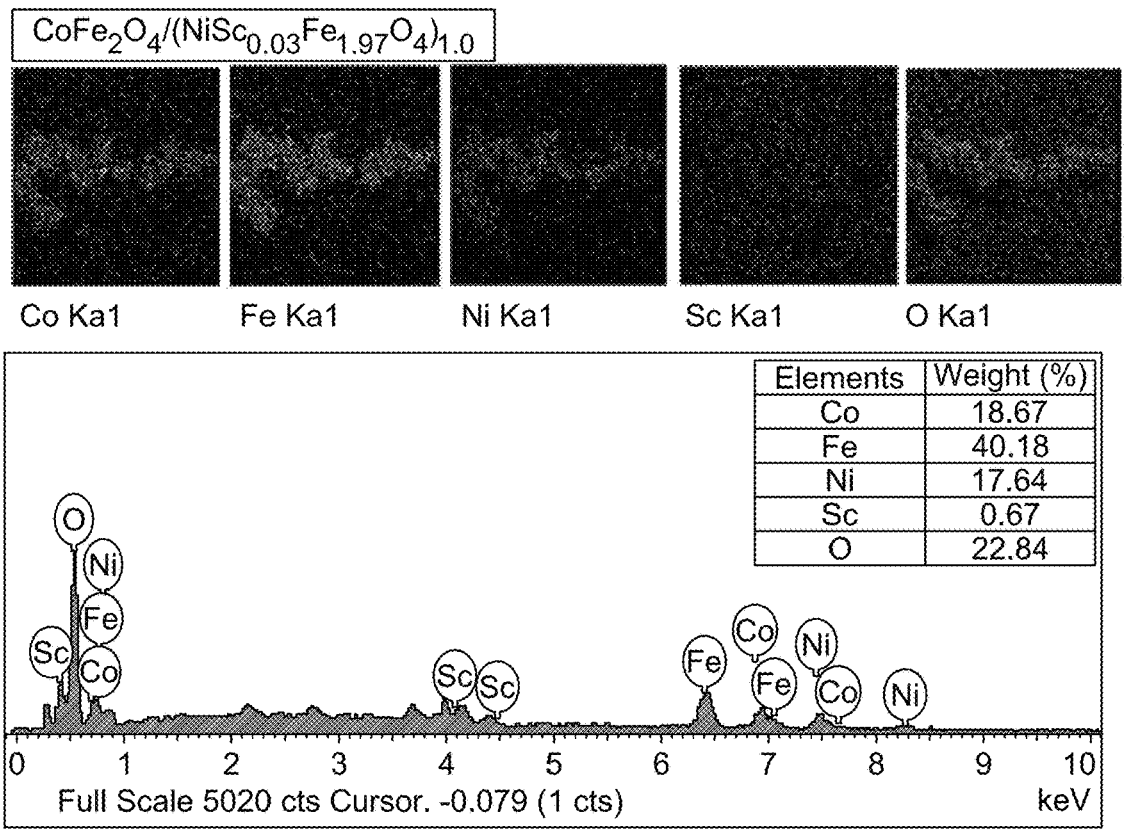
FIG. 3A shows energy dispersive X-ray spectroscopy (EDX) spectra of $CoFe_2O/(NiSc_{0.03}Fe_{1.97}O_4)$ nanocrystals, according to certain embodiments.
Figure 3B:
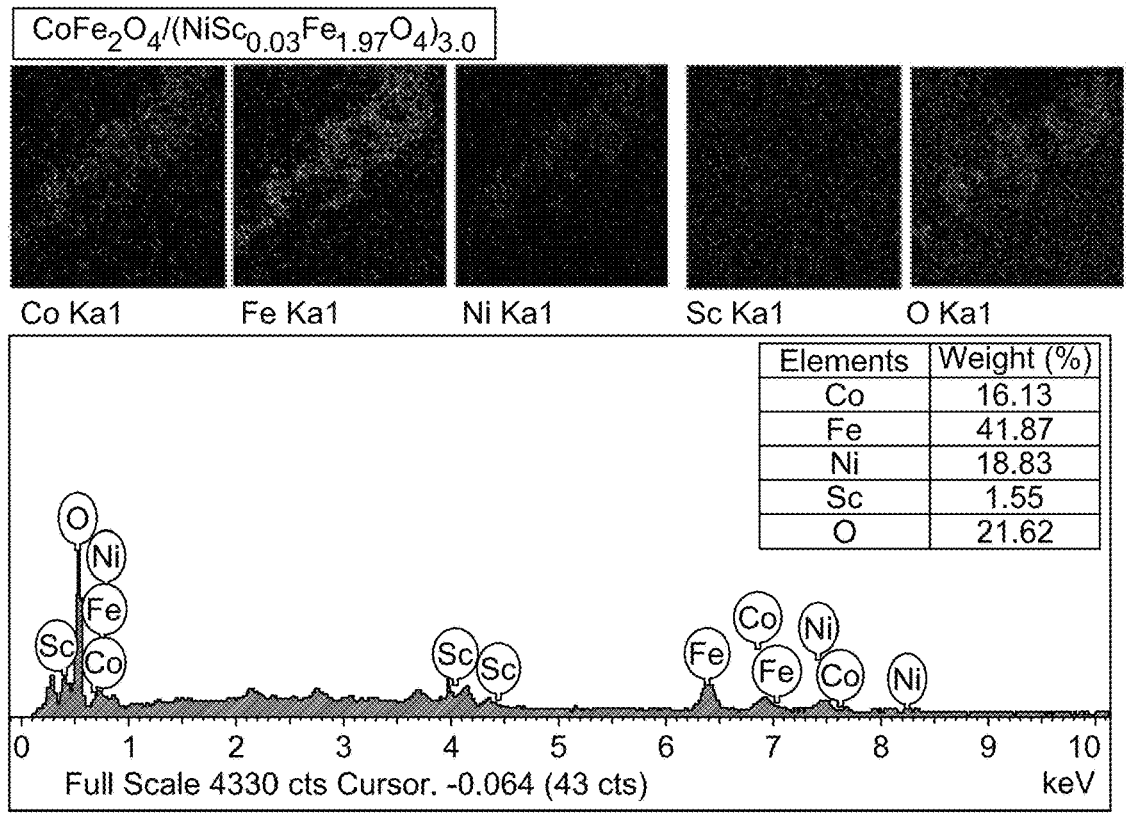
FIG. 3B shows EDX spectra of the $CoFe_2O/(NiSc_{0.03}Fe_{1.97}O_4)_3$ nanocrystals, according to certain embodiments.
Figure 4A:
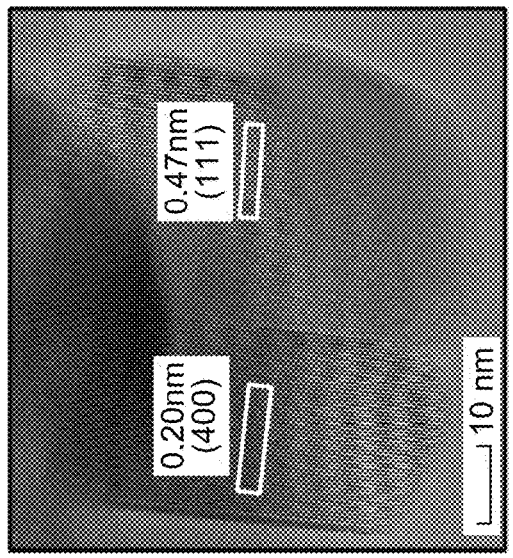
FIG. 4A shows a transmission electron microscope (TEM) image of $CoFe_2O/(NiSc_{0.03}Fe_{1.97}O_4)_2$ nanocrystals, according to certain embodiments.
Figure 4B:
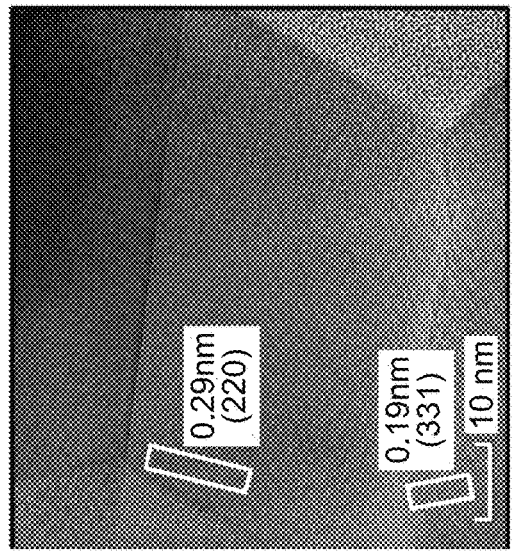
FIG. 4B shows a high-resolution TEM (HR-TEM) image of $CoFe_2O/(NiSc_{0.03}Fe_{1.97}O_4)_2$ nanocrystals, according to certain embodiments.
Figure 4C:
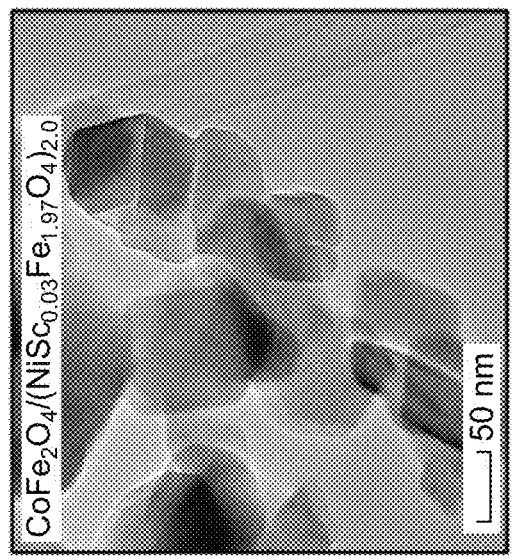
FIG. 4C shows a TEM image of $CoFe_2O/(NiSc_{0.03}Fe_{1.97}O_4)_4$ nanocrystals, according to certain embodiments.
Figure 4D:
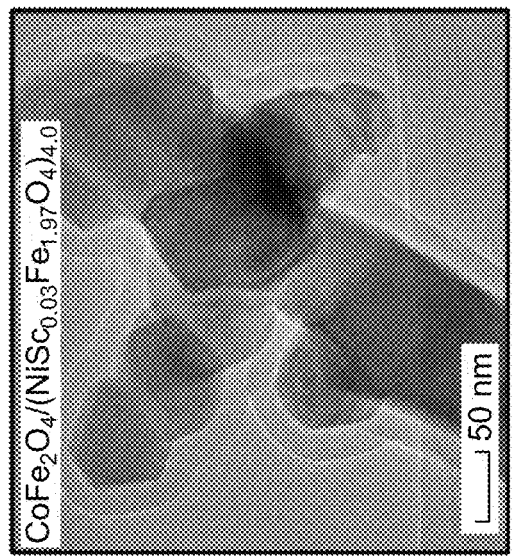
FIG. 4D shows a HR-TEM image of $CoFe_2O/(NiSc_{0.03}Fe_{1.97}O_4)_4$ nanocrystals, according to certain embodiments.
Figure 5:
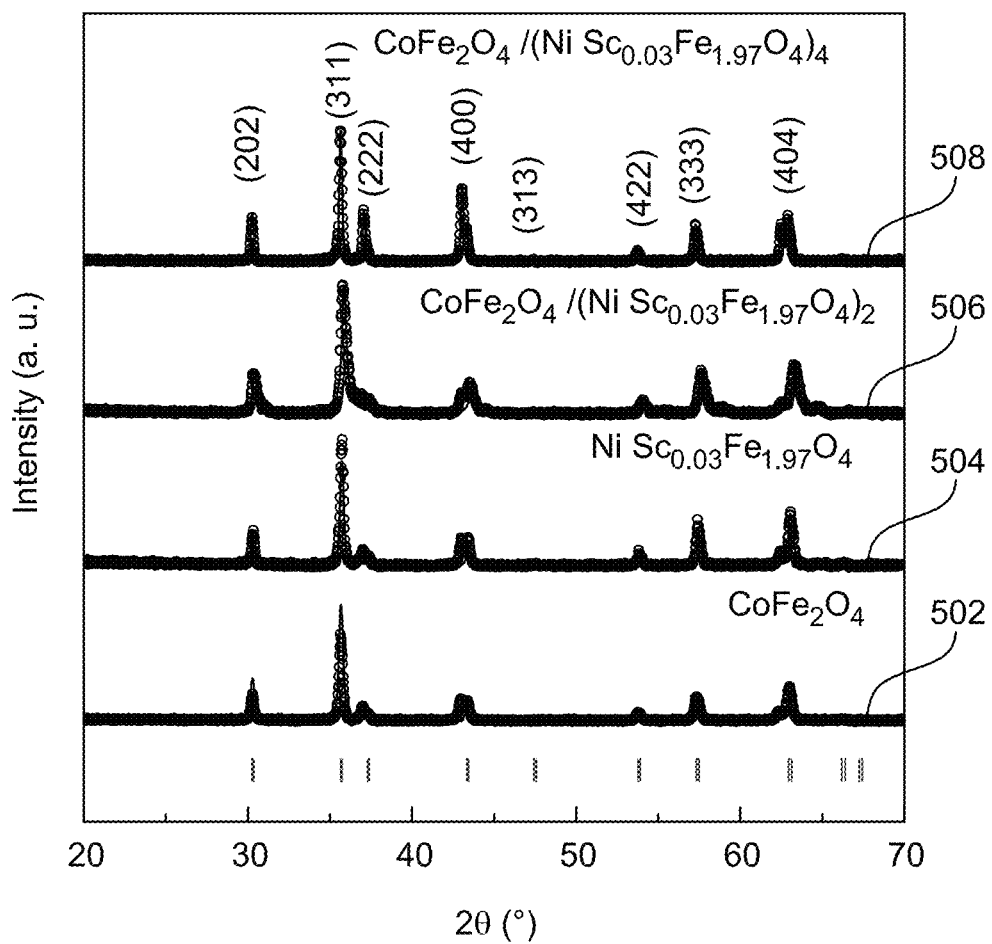
FIG. 5 shows X-ray diffractogram (XRD) pattern of nanoparticles of $CoFe_2O_4$, $NiSc_{0.03}Fe_{1.97}O_4$, $CoFe_2O_4/(NiSc_{0.03}Fe_{1.97}O_4)_2$, and $CoFe_2O_4/(NiSc_{0.03}Fe_{1.97}O_4)_4$, according to certain embodiments.
Figure 6A:
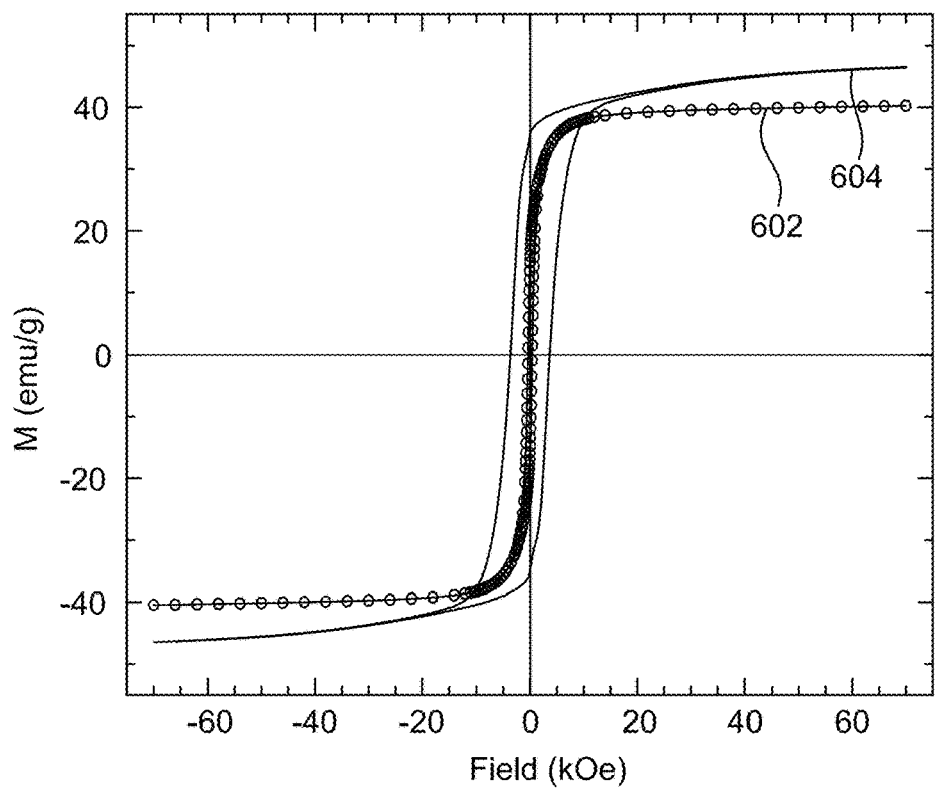
FIGS. 6A and 6B show a magnetic hysteresis (M-H) loops of spinel ferrites of $CoFe_2O_4$ nanoparticles measured at T=10 and 300 K, with various mass ratios (x), according to certain embodiments.
Figure 6B:
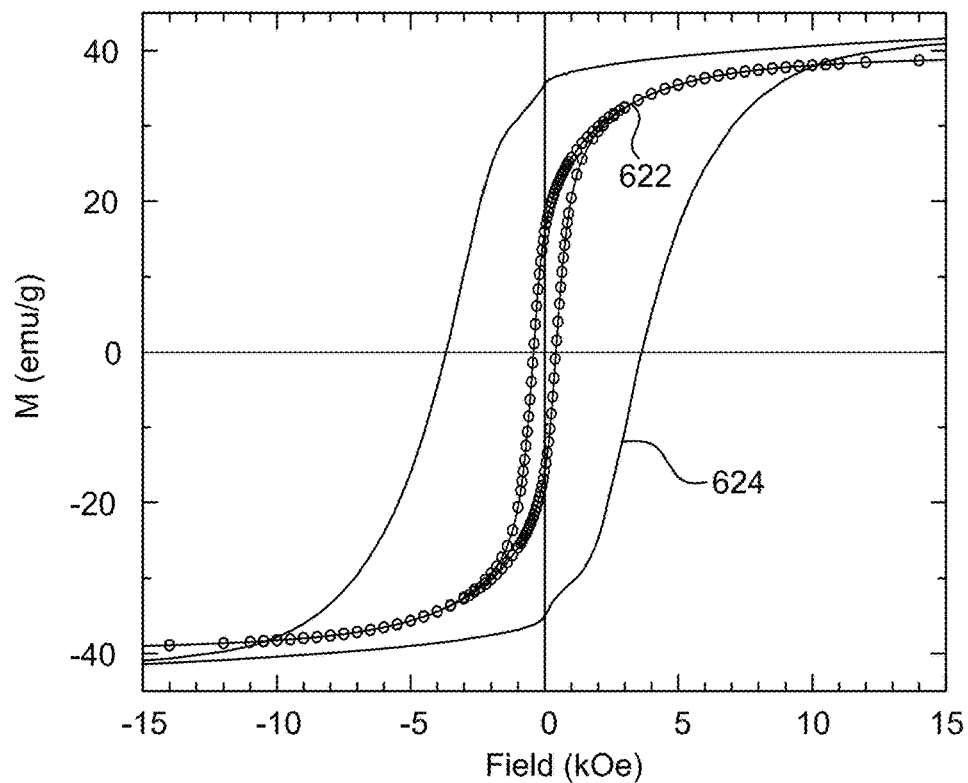
Figure 6C:
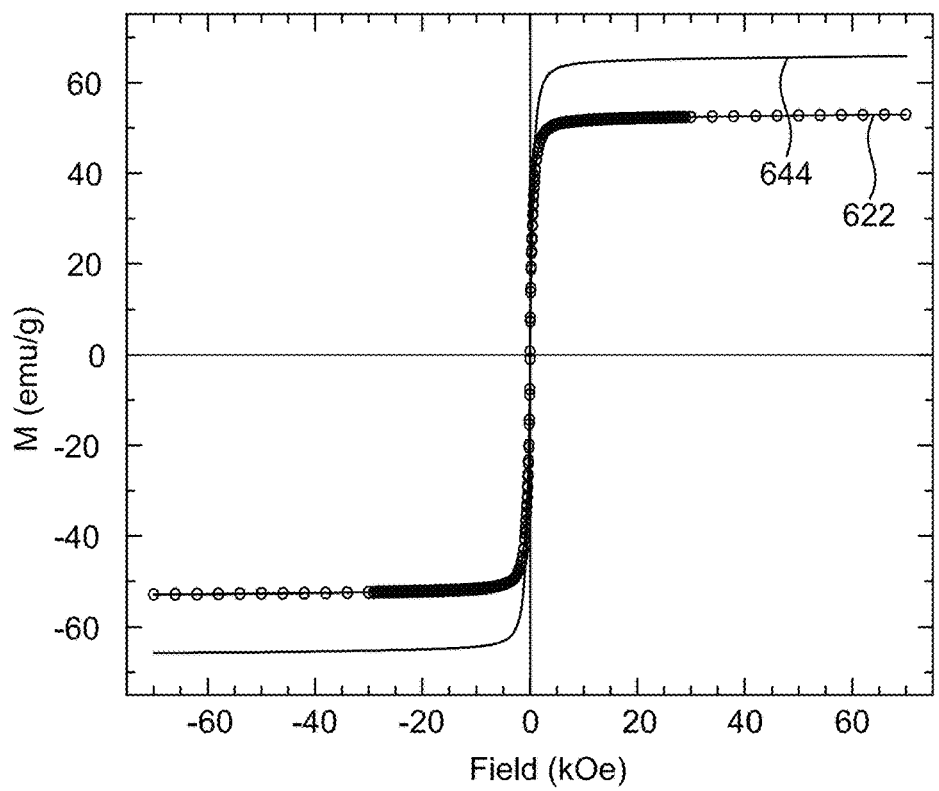
FIGS. 6C and 6D show M-H loops of spinel ferrites of $NiFe_{1.97}Sc_{0.03}O_4$ nanoparticles measured at T=10 and 300 K, with various mass ratios (x), according to certain embodiments.
Figure 6D:
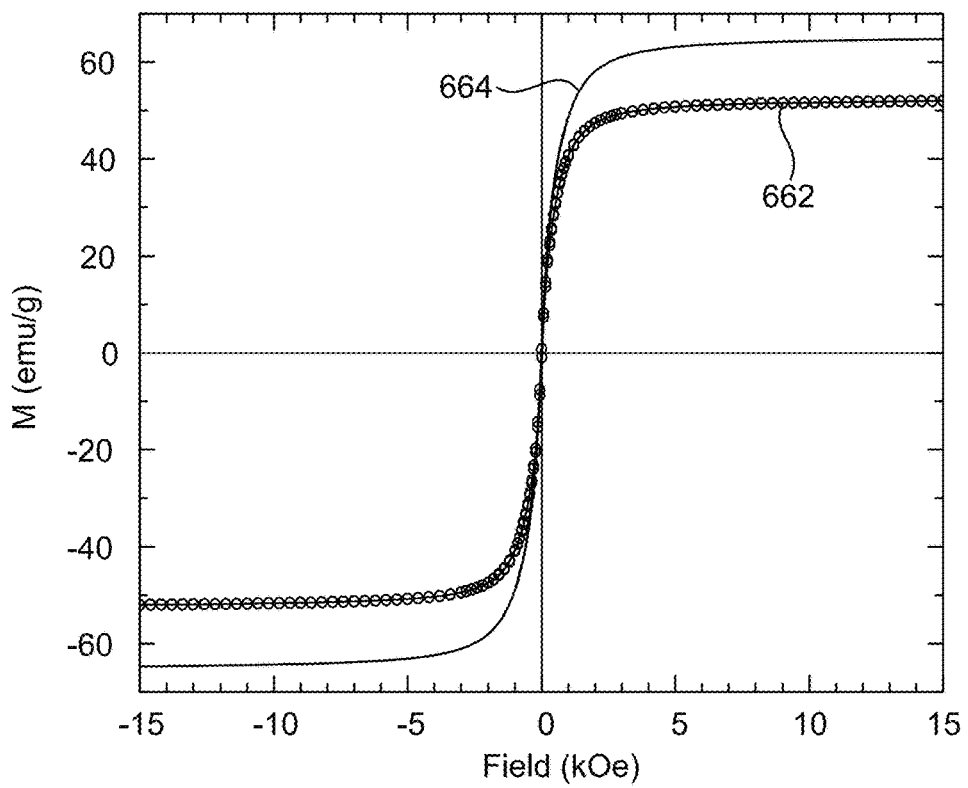
Figure 7A:
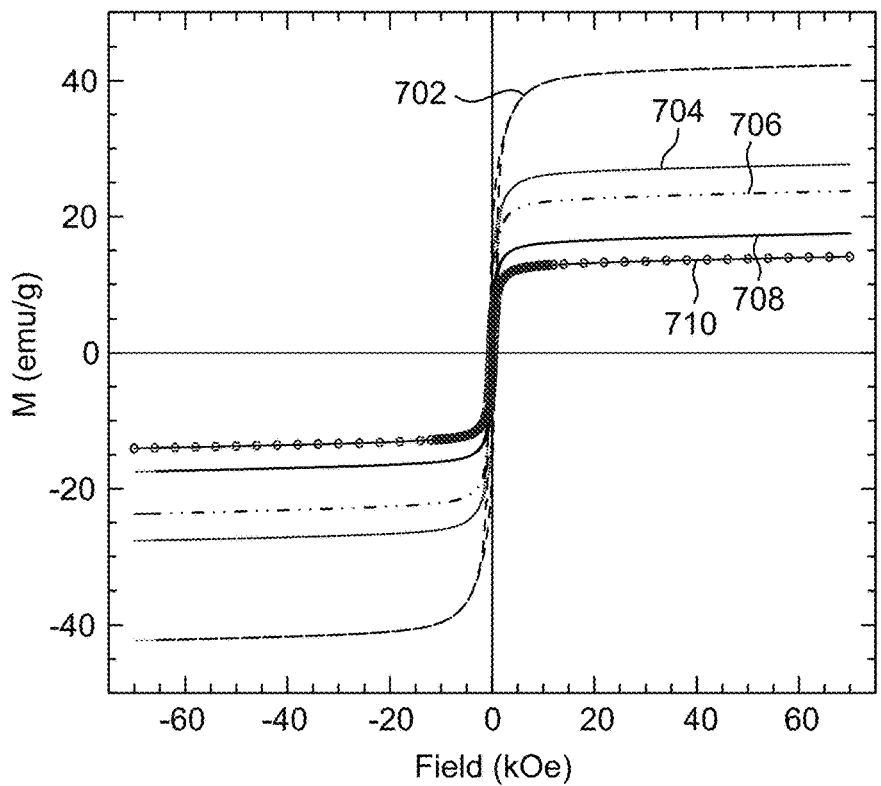
FIGS. 7A and 7B M-H loops for different hard-soft CFO-xNSFO nanocrystals with various mass ratios (x) measured at T=300 K, according to certain embodiments.
Figure 7B:
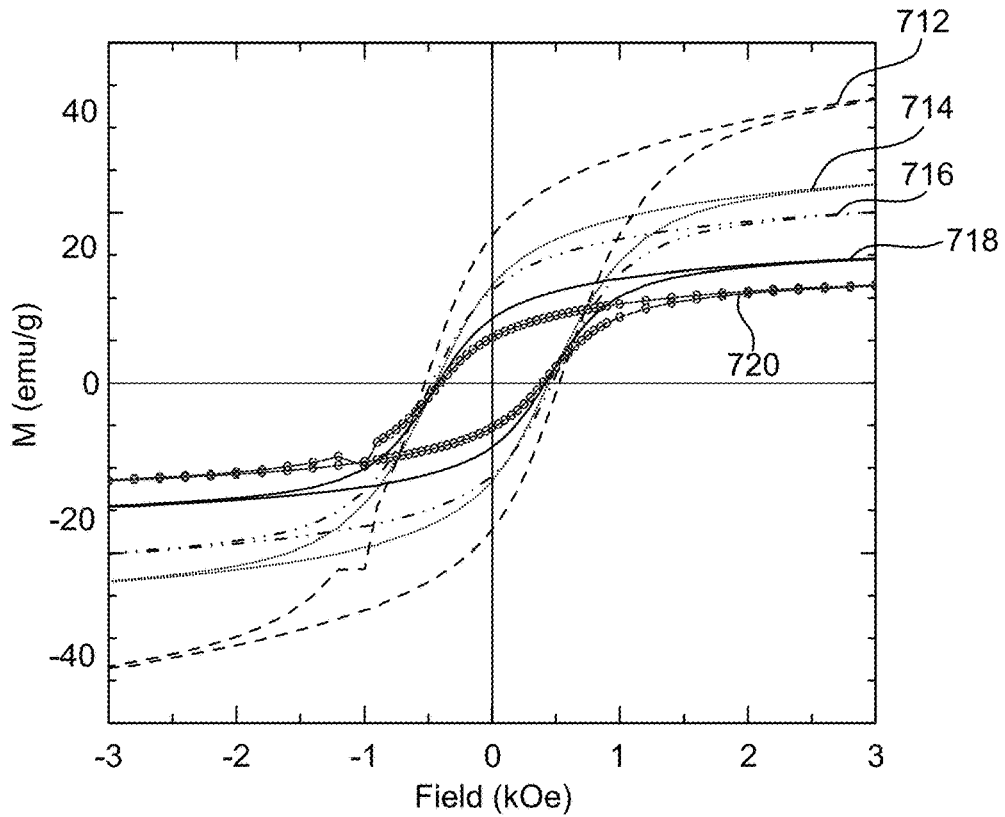
Figure 7C:
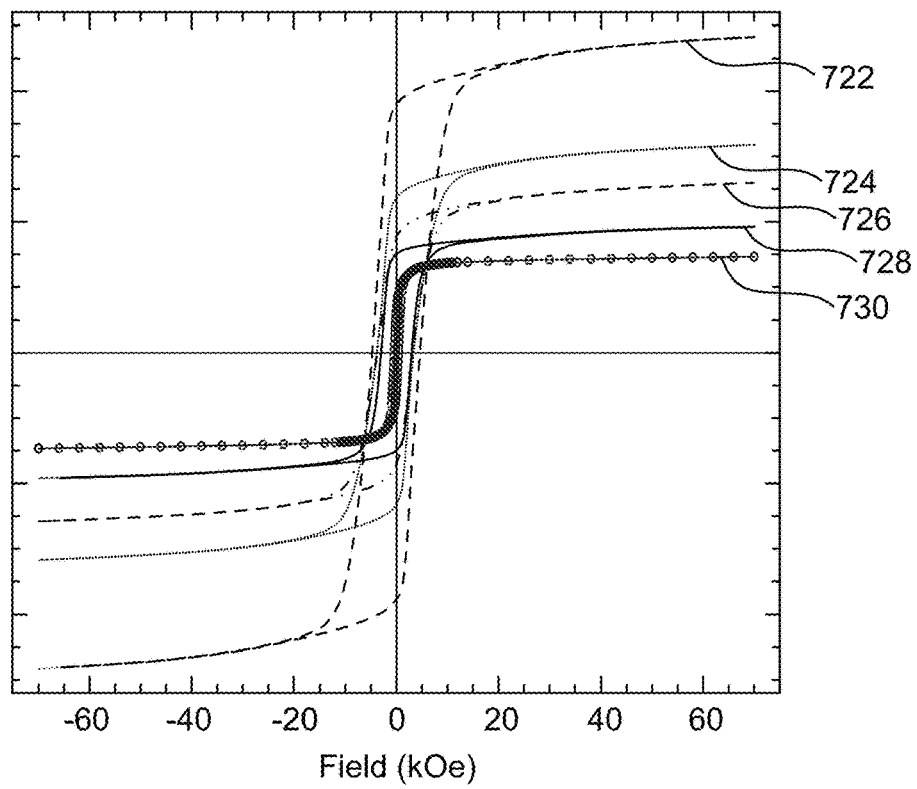
FIGS. 7C and 7D show M-H loops for different hard-soft CFO-xNSFO nanocrystals with various mass ratios (x) measured at T=10 K, according to certain embodiments.
Figure 7D:
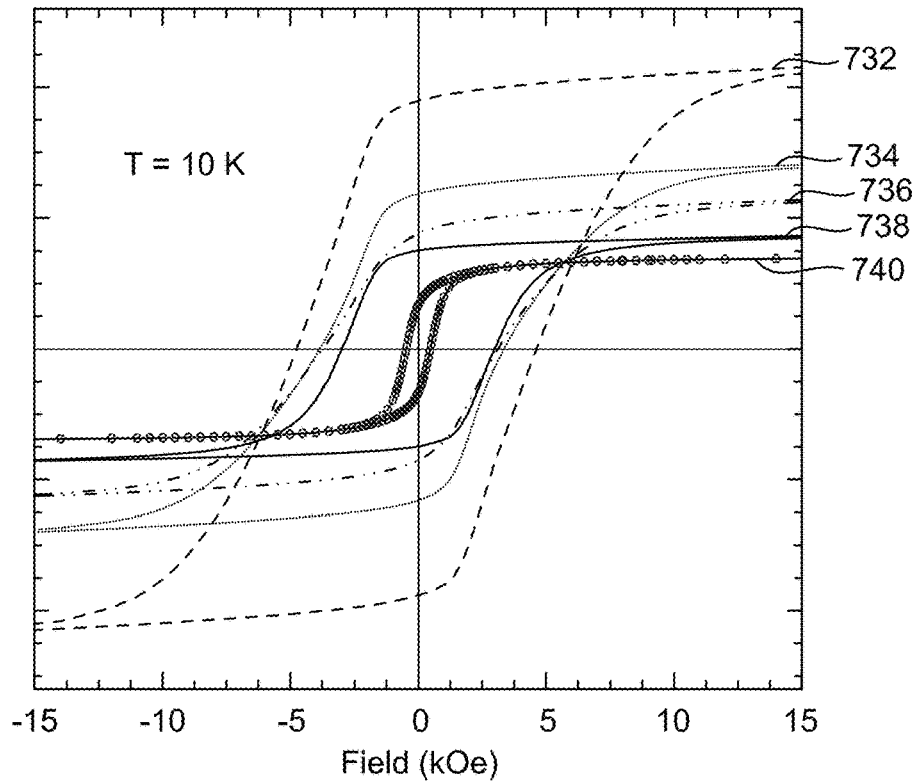

FIG. 2A-2E illustrates SEM image of nanocrystals of $CoFe_2O/(NiSc_{0.03}Fe_{1.97}O_4)$, $CoFe_2O/(NiSc_{0.03}Fe_{1.97}O_4)_2$, $CoFe_2O/(NiSc_{0.03}Fe_{1.97}O_4)_3$, $CoFe_2O/(NiSc_{0.03}Fe_{1.97}O_4)_4$, and $CoFe_2O/(NiSc_{0.03}Fe_{1.97}O_4)_5$. The elemental composition in the composite was studied using energy-dispersive X-ray spectroscopy (EDS) and corresponding graphs are shown in FIG. 3. Similarly, FIG. 4 shows the high-resolution images obtained from the transmission electron microscope (TEM) (FEI Titan ST Microscopes) to study the crystal structure and atomic spaces. The phase identification of hard/soft nanocrystals was characterized through an X-ray diffractometer from Rigaku D/MAX-2400 (Cu Kα). FIG. 5 shows XRD pattern of nanoparticles of $CoFe_2O_4$ (502), $NiSc_{0.03}Fe_{1.97}O_4$ (504), $CoFe_2O_4/(NiSc_{0.03}Fe_{1.97}O_4)_2$ (506), and $CoFe_2O/(NiSc_{0.03}Fe_{1.97}O_4)_4$ (508). The magnetic measurements of the Co-ferrite, Sc doped Ni-ferrite, and their nanocomposite were executed through Quantum Design PPMS DynaCool-9 coupled with a head of vibrating sample magnetometer (VSM) and presented in FIGS. 6 and 7, respectively. These measurements were performed at two different temperatures (i.e., 10K and 300K) to study the magnetic properties of the synthesized materials through the hysteresis loop obtained in each case. FIG. 6A shows a magnetic hysteresis (M-H) loops of spinel ferrites of $CoFe_2O_4$ nanoparticles measured at T=10 K (602) and 300 K (604), with various mass ratios (x). FIG. 6B shows a magnetic hysteresis (M-H) loops of spinel ferrites of $CoFe_2O_4$ nanoparticles measured at T=10 K (622) and 300 K (624), with various mass ratios (x). FIG. 6C shows M-H loops of spinel ferrites of $NiFe_{1.97}Sc_{0.03}O_4$ nanoparticles measured at T=10 K (642) and 300 K (644), with various mass ratios (x). FIG. 6D shows M-H loops of spinel ferrites of $NiFe_{1.97}Sc_{0.03}O_4$ nanoparticles measured at T=10 K (662) and 300 K (664), with various mass ratios (x). FIG. 7A shows M-H loops for different hard-soft CFO-xNSFO nanocrystals with various mass ratios (x)=1 (702), x=2 (704), x=3 (706), x=4 (708), and x=5 (710) measured at T=300 K. FIG. 7B shows M-H loops for different hard-soft CFO-xNSFO nanocrystals with various mass ratios (x)=1 (712), x=2 (714), x=3 (716), x=4 (718), and x=5 (720) measured at T=300 K. FIG. 7C shows M-H loops for different hard-soft CFO-xNSFO nanocrystals with various mass ratios (x)=1 (722), x=2 (724), x=3 (726), x=4 (728), and x=5 (730) measured at T=10 K. FIG. 7D shows M-H loops for different hard-soft CFO-xNSFO nanocrystals with various mass ratios (x)=1 (732), x=2 (734), x=3 (736), x=4 (738), and x=5 (740) measured at T=10K.

Example 2: Device Architecture of the Magnetic Supercapacitor

Figure 8:
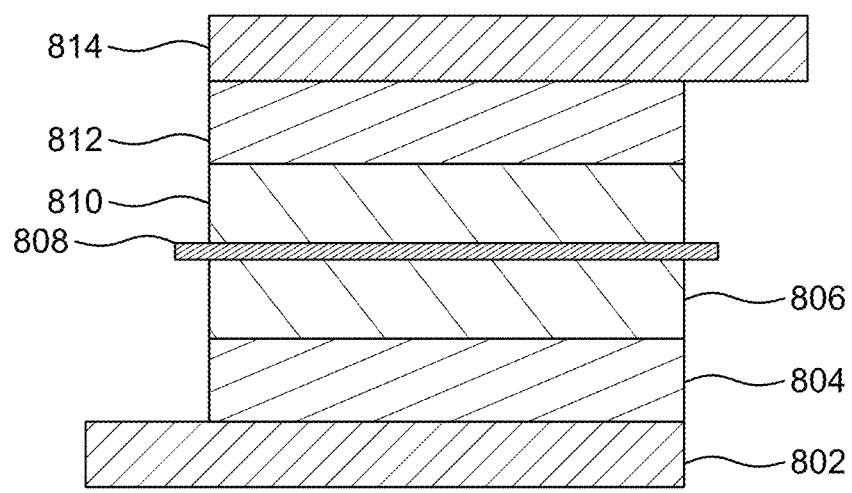
FIG. 8 shows a schematic diagram of a magnetic supercapacitor fabricated using CFO-xNSFO (1≤x≤5) nanocrystals supported on an activated carbon electrode, according to certain embodiments.

The magnetic supercapacitor was fabricated using (Al (802)/AC (804)+magnetic nanocomposite (806)/dielectric separator (808)/magnetic nanocomposite (810)+AC (812)/Al (814)) as shown in schematic FIG. 8. In some embodiments, the supercapacitor was fabricated in a symmetric configuration. In some embodiments, the supercapacitor may be fabricated in an asymmetric configuration. The magnetic materials were mixed with activated carbon (AC) in different compositions and converted to a conductive paste using Polyvinylidene fluoride (PVDF) binder in N-Methyl-2-pyrrolidone (NMP) solvent. Final electrodes were prepared by coating this conductive paste/slurry on an aluminum (Al) current collector using an automatic doctor blade coating machine. These electrodes were dried in a vacuum at 80° C. for 12 hours and then cut into circular disks for further characterizations.

Example 3: Device Characterization

Figure 9A:
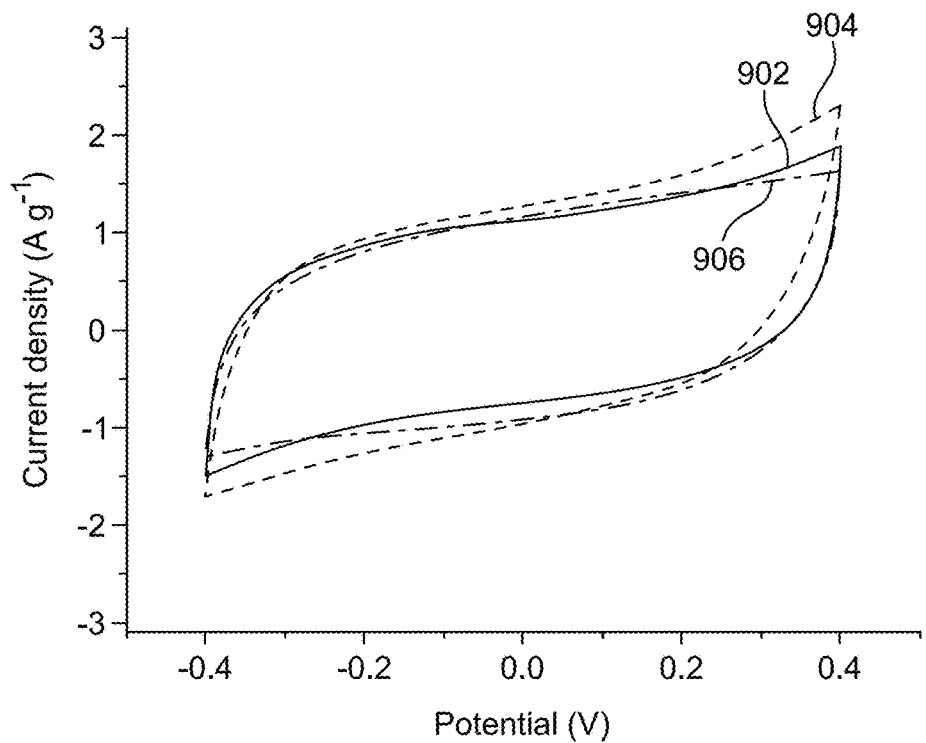
FIG. 9A shows cyclic voltammogram (CV) curves of 10% Co-ferrite and Sc doped Ni-ferrite nanoparticles in comparison to reference carbon-based supercapacitor at 10 mV·s$^{-1}$, according to certain embodiments.
Figure 9B:
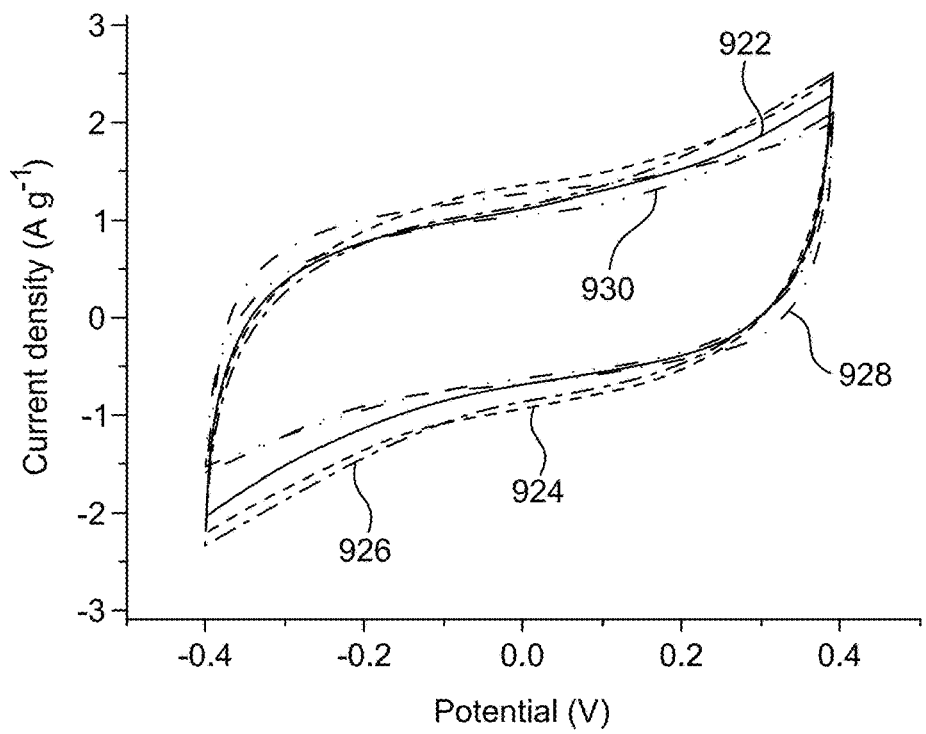
FIG. 9B shows CVs of CFO-xNSFO (1≤x≤5) nanocrystals at 10 mV s$^{-1}$, according to certain embodiments.

Galvanostatic charge-discharge (GCD), cyclic voltammetry (CV), and electrochemical impedance spectroscopy (EIS) were performed to investigate the electrochemical behavior of the hard/soft $CoFe_2O_4/(NiSc_{0.03}Fe_{1.97}O_4)X$ ($0 \le x \le 5$) nanocomposite modified carbon supercapacitor using 1M NaOH aqueous electrolyte. The cobalt ferrite ($CoFe_2O_4$) nanoparticles were used in different percentages such as (5%, 10%, 15%, and 20% w/w) to modify the carbon electrodes. A supercapacitor was fabricated for each percentage and analyzed through CV in the potential ranging from −0.4 V to +0.4 V at a 10 mV s$^{-1}$ scan rate using Metrohm auto lab. It was noticed that the best CV in terms of the highest specific capacitance is obtained for 10% addition of magnetic nanocrystals to AC electrodes. So, all the magnetic nanocomposite ratios were mixed in AC at 10% (w/w) to perform further electrochemical measurements. FIGS. 9A and 9B show the CV analysis for 10% of cobalt ferrite (902) and Sc doped nickel ferrite, i.e., 10% $NiSc_{0.03}Fe_{1.97}O_4$, (904), and compared to a reference carbon electrode (906).

Figure 9C:
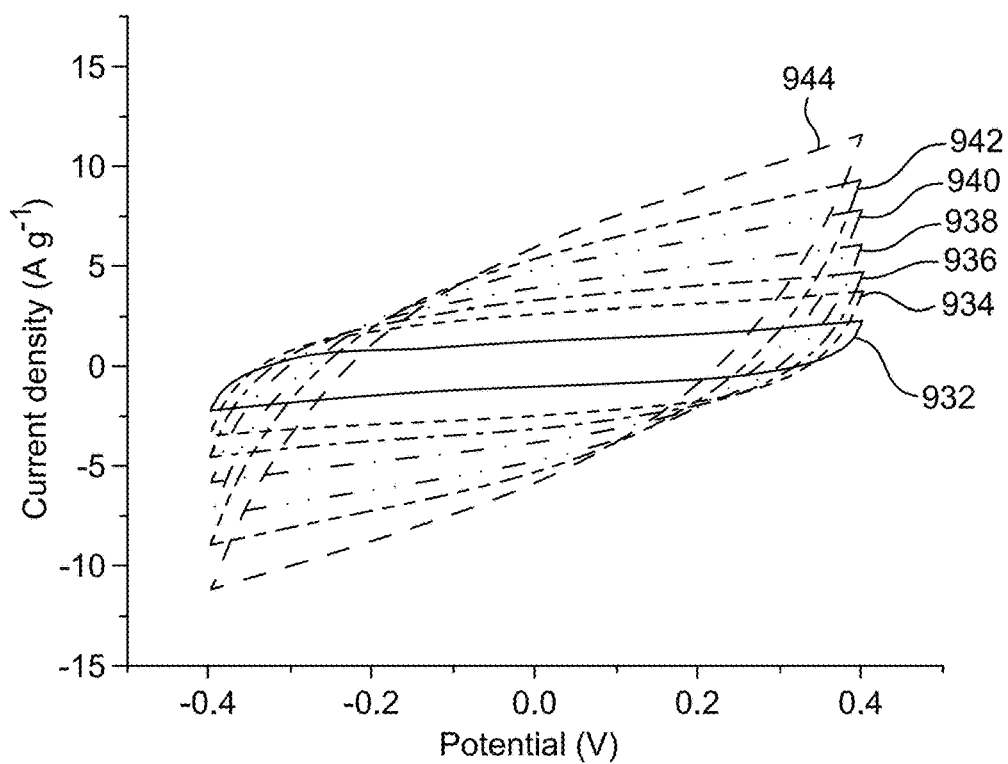
FIG. 9C shows CVs of co-ferrite/Ni-ferrite nanocomposite for x=2 doping ratio at different scan rates, according to certain embodiments.
Figure 9D:
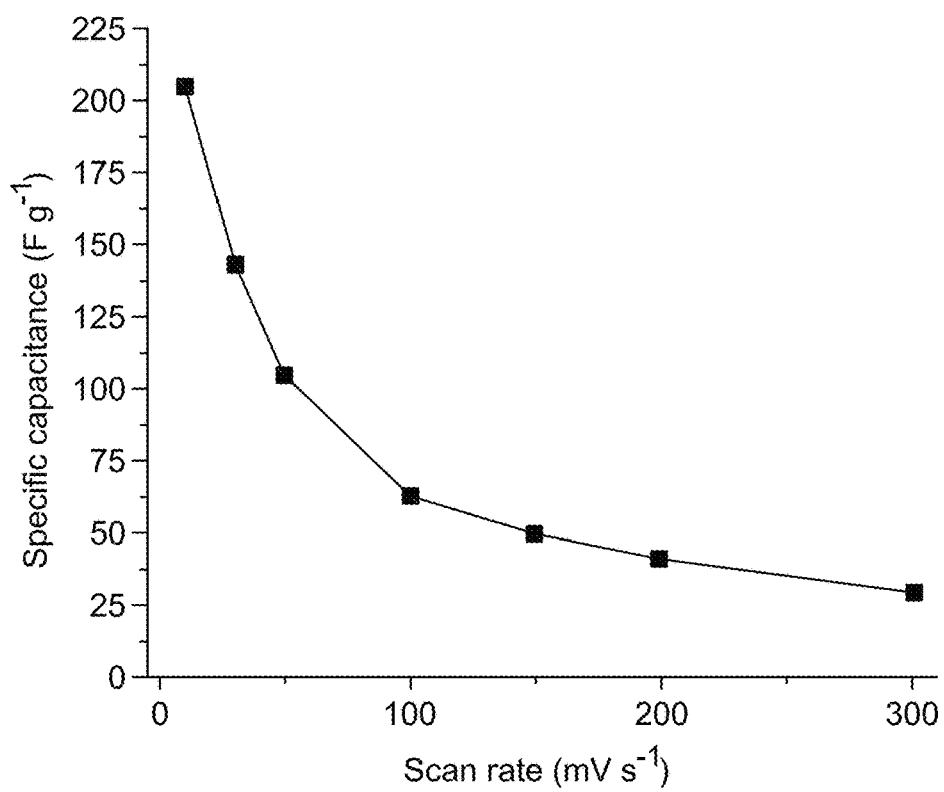
FIG. 9D is a plot showing specific capacitance vs. scan rate of x=2 concentration, according to certain embodiments.

Similarly, the CV analysis of $CoFe_2O_4/(NiSc_{0.03}Fe_{1.97}O_4)_x$ at different ratios (i.e., x=1, 2, 3, 4, 5) in the same potential range at 10 mV s$^{-1}$ sweep rate. The CV analysis for the supercapacitors with $CoFe_2O_4/(NiSc_{0.03}Fe_{1.97}O_4)_1$ (922), $CoFe_2O_4/(NiSc_{0.03}Fe_{1.97}O_4)_2$ (924), $CoFe_2O_4/(NiSc_{0.03}Fe_{1.97}O_4)_3$ (926), $CoFe_2O_4/(NiSc_{0.03}Fe_{1.97}O_4)_4$ (928), and $CoFe_2O_4/(NiSc_{0.03}Fe_{1.97}O_4)_5$ (930) are depicted in FIG. 9B. The results indicate that the supercapacitor with concentration CFO-xNSFO for (x=2), i.e., $/(NiSc_{0.03}Fe_{1.97}O_4)_2$ (924), gives the highest specific capacitance of 204.4 F g$^{-1}$ at a 10 mV s$^{-1}$ sweep rate. FIG. 9C shows the CV response of CFO-xNSFO nanocomposite for x=2 ratio, at various scan rates ranging from 10 to 300 mV s$^{-1}$ particularly, 10 mV (932), 30 mV (934), 50 mV (936), 100 mV (938), 150 mV (940), 200 mV (942), and 300 mV (944). The specific capacitance of the supercapacitor for x=2 was plotted as a function of scan speed, with the highest value of 204.4 F g$^{-1}$ achieved at 10 mV s$^{-1}$ as shown in FIG. 9D. The value of specific capacitance declines with the increase in the scan speed, which indicates the fact that ions can access only the outer surface of the electrodes at high scan rates.

Figure 10A:
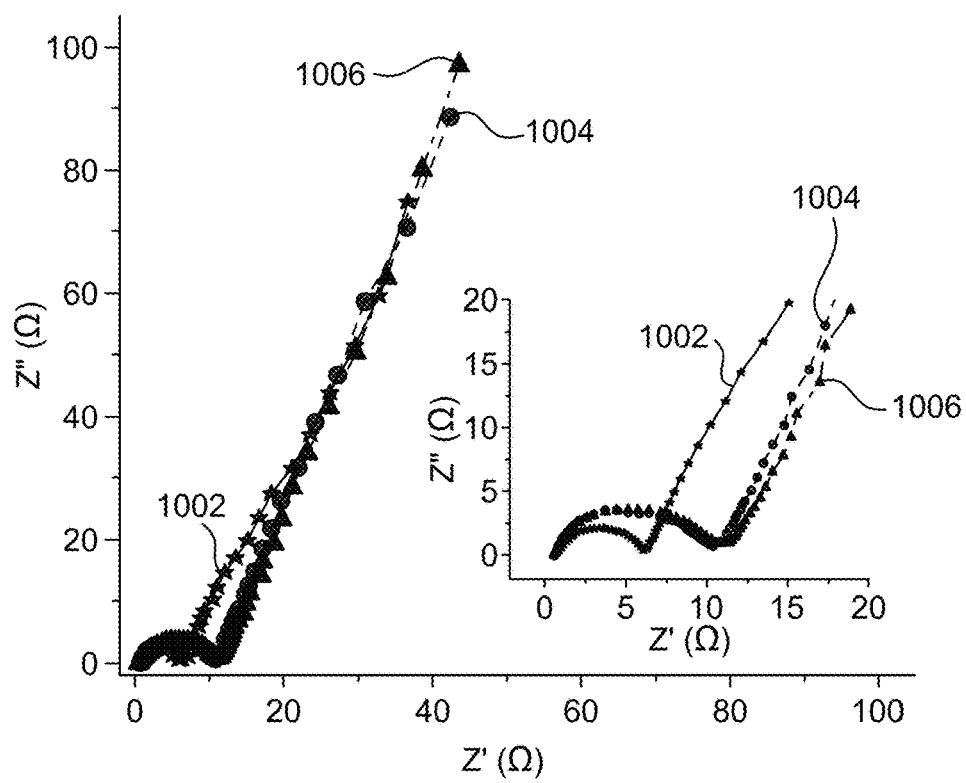
FIG. 10A shows electrochemical impedance spectroscopy (EIS) of 10% Co-ferrite, Sc doped Ni-ferrite, and reference carbon-based supercapacitors at 0 bias voltage, according to certain embodiments.
Figure 10B:
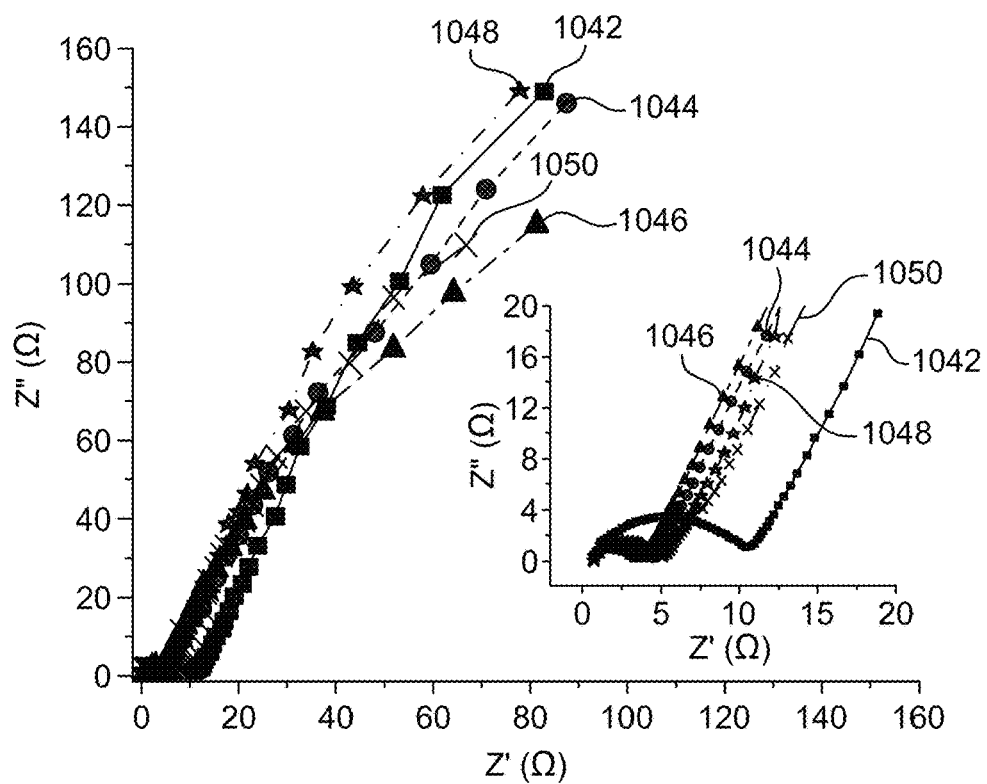
FIG. 10B shows EIS of CFO-xNFSO (1≤x≤5) nanocrystals, according to certain embodiments.
Figure 10C:
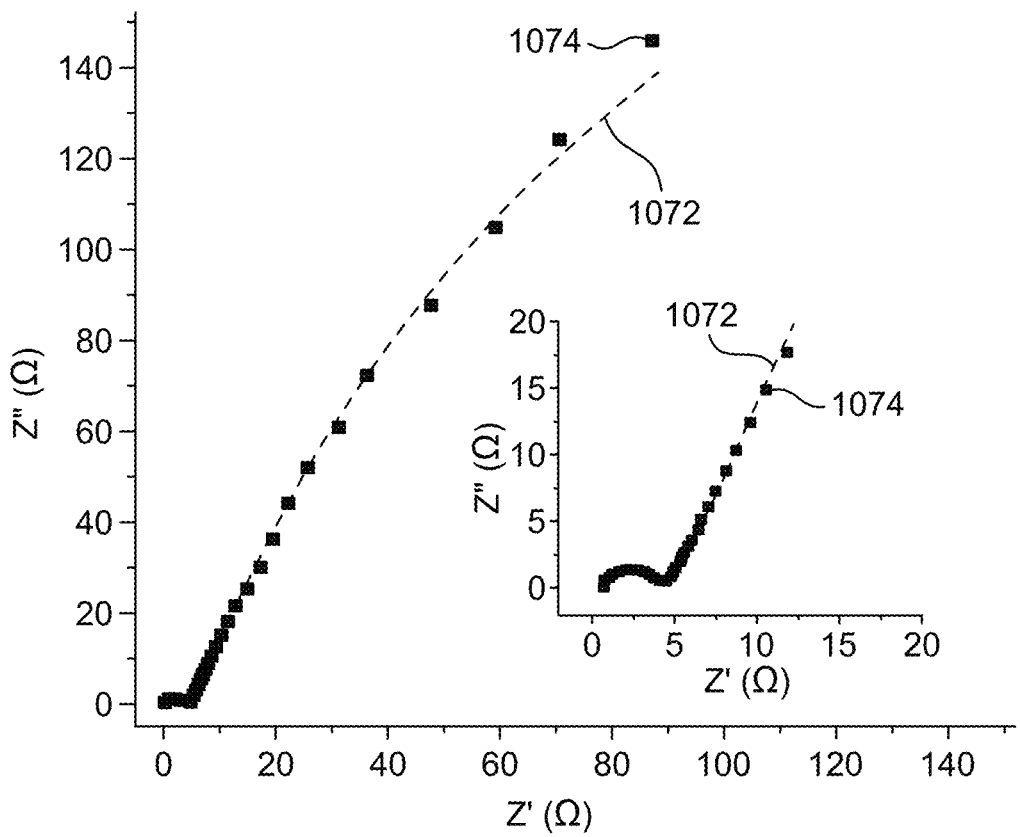
FIG. 10C shows EIS fitting of CFO-xNSFO supercapacitor for x=2 concentration, according to certain embodiments.
Figure 10D:
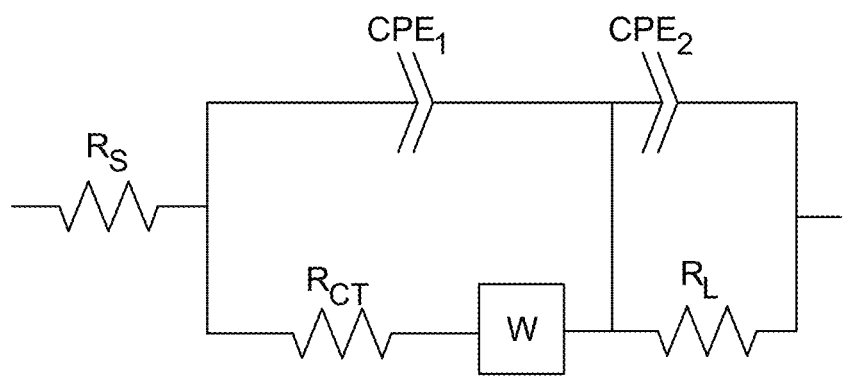
FIG. 10D depicts an equivalent circuit of the fitted data, according to certain embodiments.
Figure 11A:
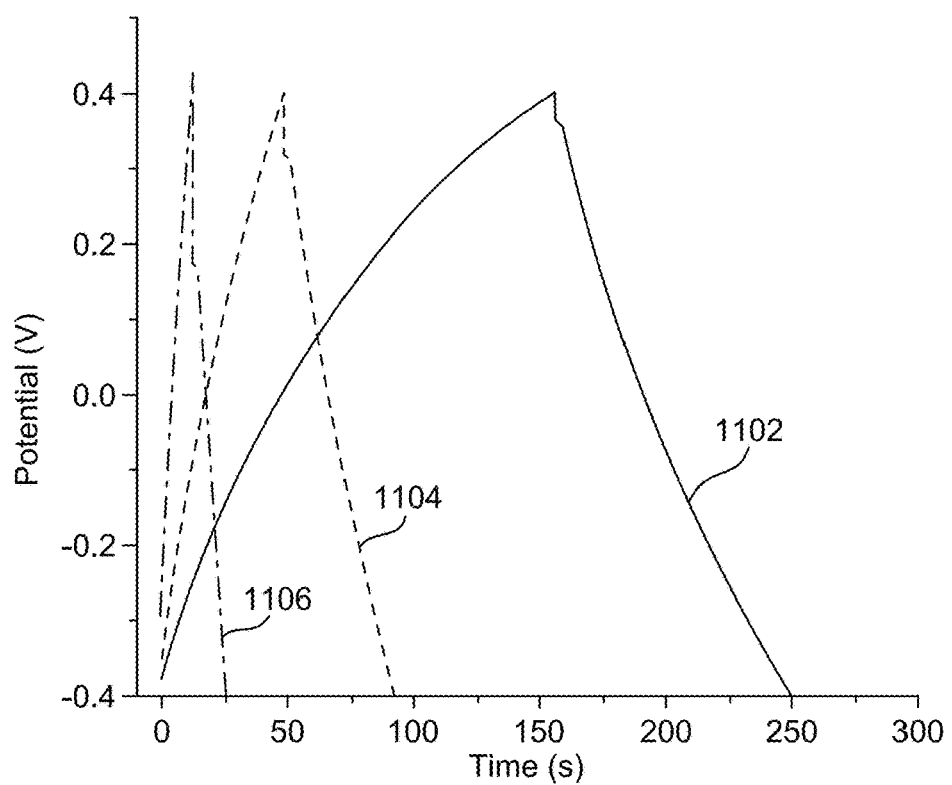
FIG. 11A GCD analysis for $CoFe_2O/(NiSc_{0.03}Fe_{1.97}O_4)_1$ nanocrystals modified supercapacitors, according to certain embodiments.
Figure 11B:
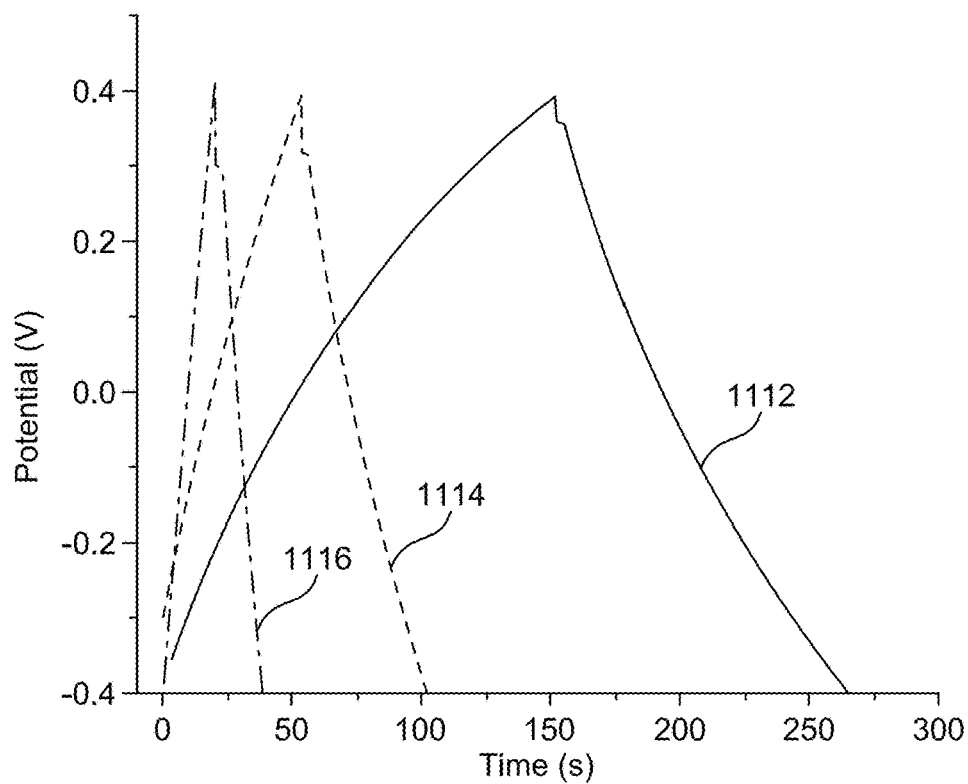
FIG. 11B GCD analysis for $CoFe_2O/(NiSc_{0.03}Fe_{1.97}O_4)_2$ nanocrystals modified supercapacitors, according to certain embodiments.
Figure 11C:
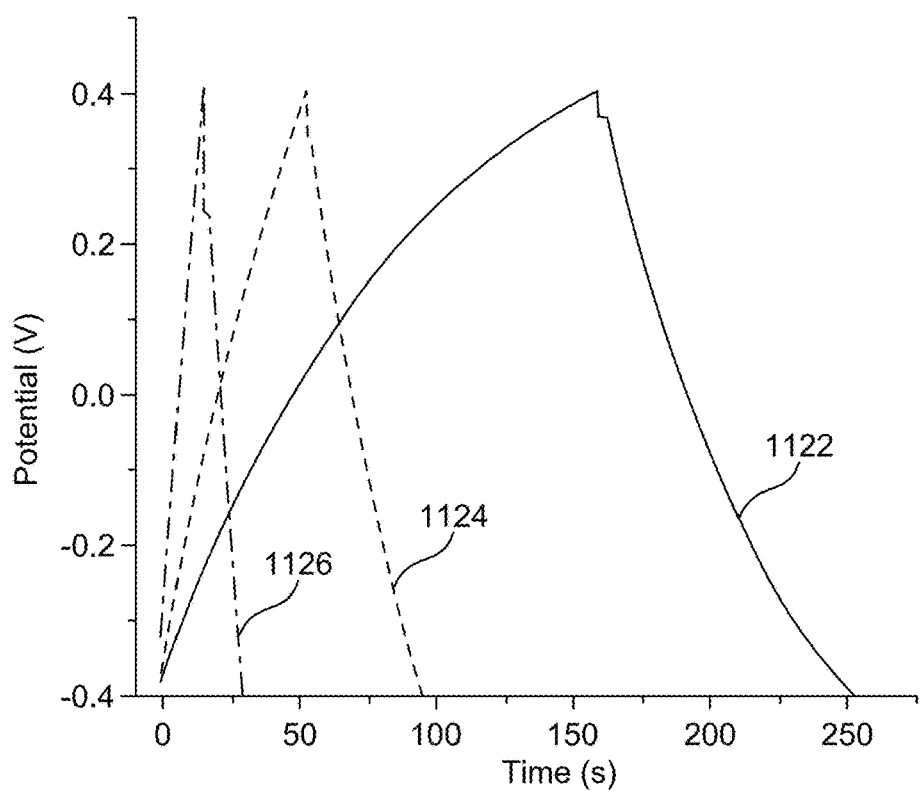
FIG. 11C GCD analysis for $CoFe_2O/(NiSc_{0.03}Fe_{1.97}O_4)_3$ nanocrystals modified supercapacitors, according to certain embodiments.
Figure 11D:
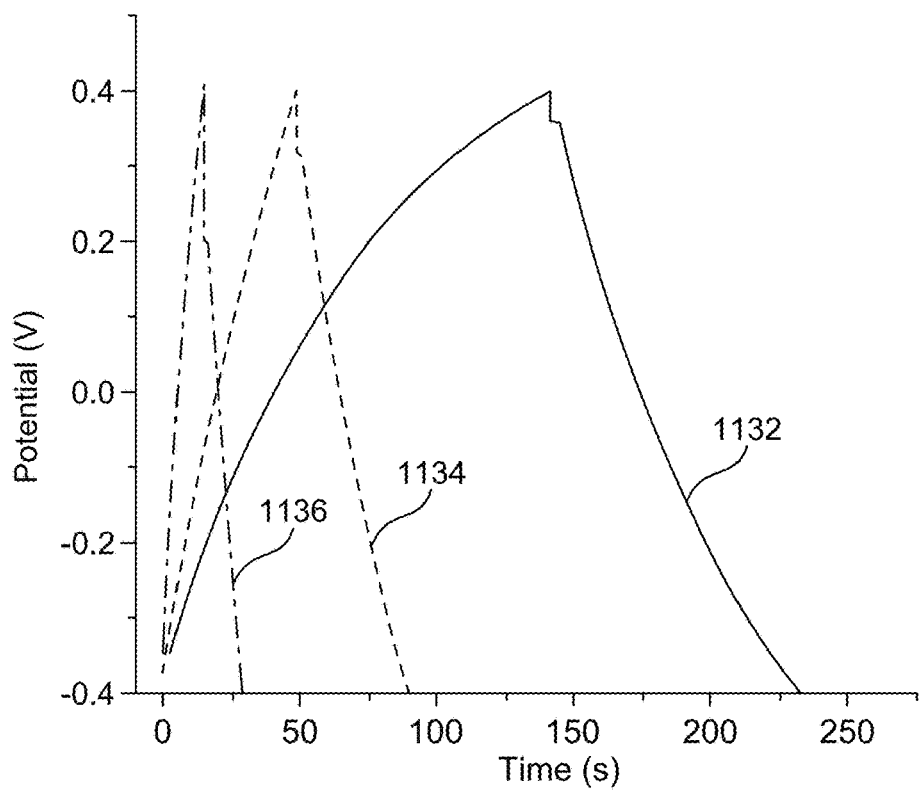
FIG. 11D GCD analysis for $CoFe_2O/(NiSc_{0.03}Fe_{1.97}O_4)_4$ nanocrystals modified supercapacitors, according to certain embodiments.
Figure 11E:
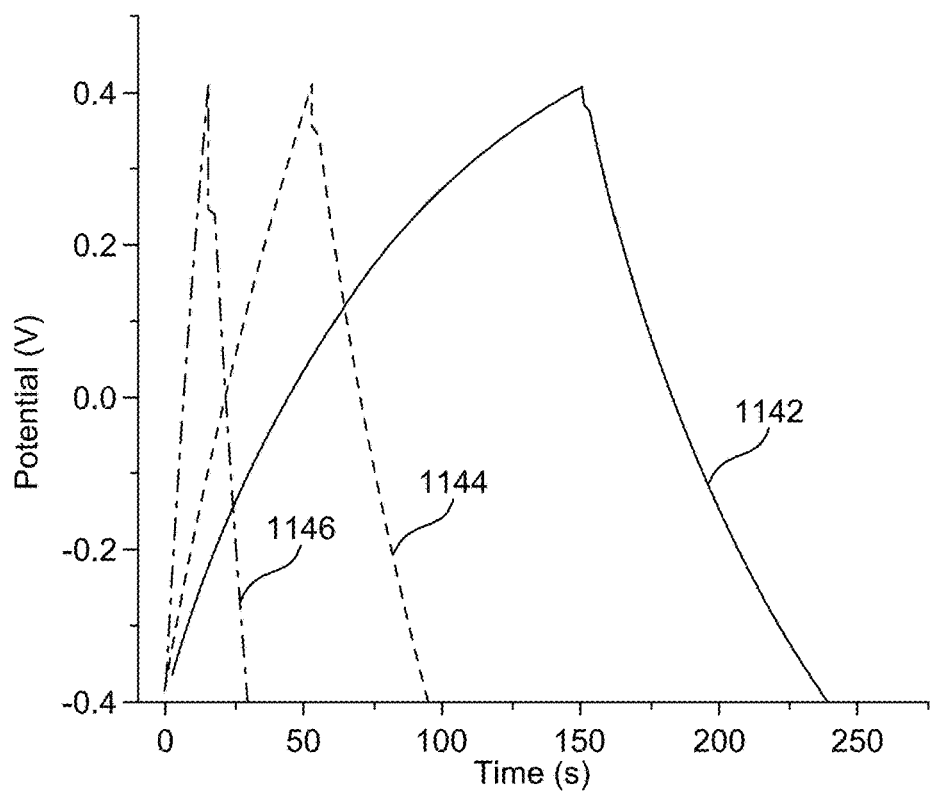
FIG. 11E GCD analysis for $CoFe_2O_4/(NiSc_{0.03}Fe_{1.97}O_4)_5$ nanocrystals modified supercapacitors, according to certain embodiments.
Figure 11F:
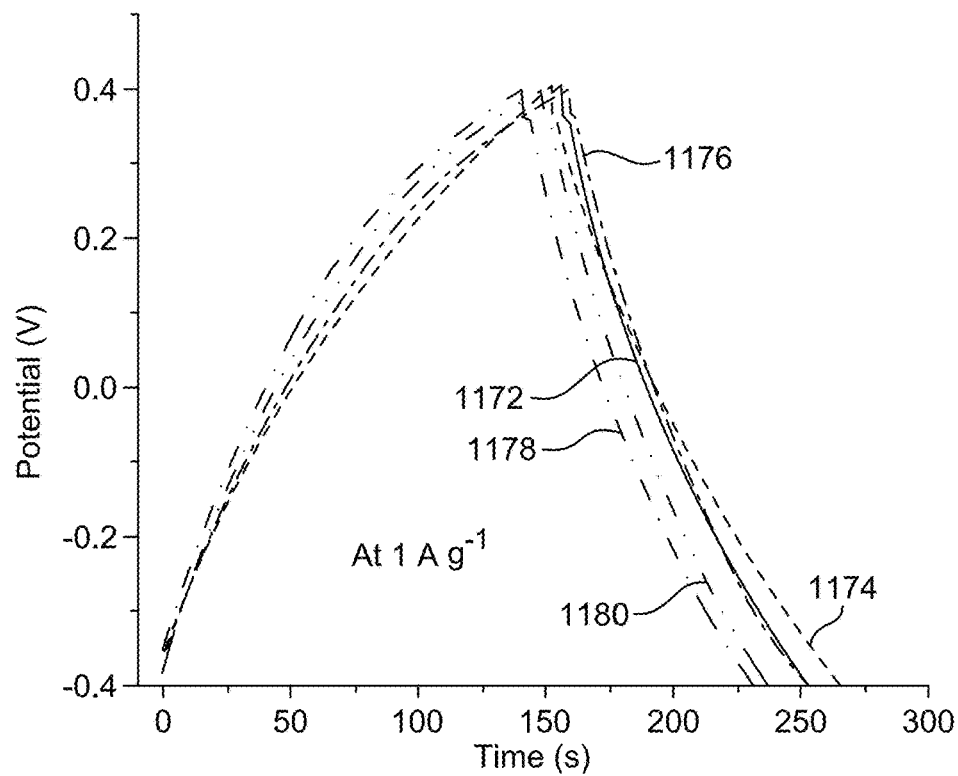
FIG. 11F shows a comparison of GCD response for all concentrations of magnetic nanocomposites at 1 A g$^{-1}$ or 2 mA, according to certain embodiments.

Electrochemical impedance spectroscopy (EIS) for 10% Co-ferrite (1002), 10% Sc doped Ni-ferrite (1004), and reference carbon-based supercapacitors (1006) are investigated in the frequency range of 0.01 Hz to 100 kHz and presented in terms of the Nyquist plot in FIG. 10A. The real and imaginary parts of impedance are plotted to analyze different resistance parameters related to the device. The inset (FIG. 10A) shows the intercept with the x-axis in the high-frequency region, representing the electrode resistance R. The value of R is estimated to be 0.83, 0.67, and 0.59Ω for reference carbon-based supercapacitors (1006), Co-ferrite (1002), and Sc doped Ni-ferrite supercapacitors (1004), respectively. FIG. 10B shows the Nyquist plot for different compositions of CFO-xNSFO (1≤x≤5) nanocomposites, namely, $CoFe_2O_4/(NiSc_{0.03}Fe_{1.97}O_4)_1$ (1042), $CoFe_2O_4/(NiSc_{0.03}Fe_{1.97}O_4)_2$ (1044), $CoFe_2O_4/(NiSc_{0.03}Fe_{1.97}O_4)_3$ (1046), $CoFe_2O_4/(NiSc_{0.03}Fe_{1.97}O_4)_4$ (1048), and $CoFe_2O_4/(NiSc_{0.03}Fe_{1.97}O_4)_5$ (1050). The $R_e$ value for x=1 concentration is 0.81Ω whereas, the other concentrations have a Re-value in the range of 0.68 to 0.74Ω estimated from the x-intercept in the higher frequency region. FIG. 10C shows the perfect fitting of the experimental values of x=2 supercapacitor (1072) with the original (1074), in the high-frequency region and very good in the low-frequency region with the suggested equivalent circuit as shown in FIG. 10D.

The charge-discharge profile of the magnetic supercapacitors was analyzed at different current densities and presented in FIGS. 11A-11E. All the supercapacitors were charged from −0.4 V to +0.4 V and then discharged to −0.4 V at a constant current density. $CoFe_2O_4$ ($NiSc_{0.03}Fe_{1.97}O_4$) was tested for three different current densities as 1 A·g$^{-1}$ (1102), 1.5 A·g$^{-1}$ (1104), and 2.5 A·g$^{-1}$ (1106); $CoFe_2O_4$ $(NiSc_{0.03}Fe_{1.97}O_4)_2$ was tested for three different current densities as 1 A·g$^{-1}$ (1112), 1.5 A·g$^{-1}$ (1114), and 2.5 A·g$^{-1}$ (1116); $CoFe_2O_4(NiSc_{0.03}Fe_{1.97}O_4)_3$ was tested for three different current densities as 1 A·g$^{-1}$ (1122), 1.5 A·g$^{-1}$ (1124), and 2.5 A·g$^{-1}$ (1126); $CoFe_2O_4(NiSc_{0.03}Fe_{1.97}O_4)_4$ was tested for three different current densities as 1 A·g$^{-1}$ (1132), 1.5 A·g$^{-1}$ (1134), and 2.5 A·g$^{-1}$ (1136); and $CoFe_2O_4$ $(NiSc_{0.03}Fe_{1.97}O_4)_5$ was tested for three different current densities as 1 A·g$^{-1}$ (1142), 1.5 A·g$^{-1}$ (1144), and 2.5 A·g$^{-1}$ (1146), to investigate the performance at higher currents. A comparison is presented in FIG. 10F for all the devices, $CoFe_2O_4(NiSc_{0.03}Fe_{1.97}O_4)$ (1172), $CoFe_2O_4$ $(NiSc_{0.03}Fe_{1.97}O_4)_2$ (1174), $CoFe_2O_4$ $(NiSc_{0.03}Fe_{1.97}O_4)_3$ (1176), $CoFe_2O_4(NiSc_{0.03}Fe_{1.97}O_4)_4$ (1178), and $CoFe_2O_4$ $(NiSc_{0.03}Fe_{1.97}O_4)_5$ (1180), investigated at 1 A g$^{-1}$. A small IR drop at 1 A g$^{-1}$ can be observed in all GCD curves that is attributed to the dielectric nature of the magnetic nanocomposites. The IR drop increases for higher current densities that are expected due to the high current drawn from the device.

Figure 12A:
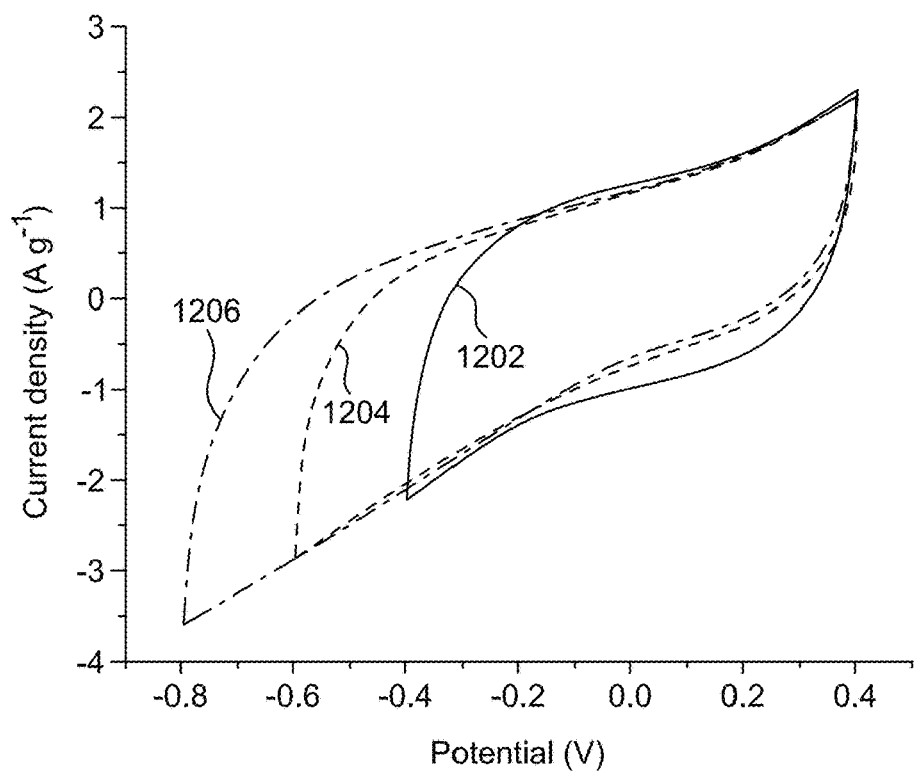
FIG. 12A shows a CV of CFO-xNSFO nanocomposite for x=2 ratio or (CoFe$_2$O/(NiSc$_{0.03}$Fe$_{1.97}$O$_4$)$_2$) nanocomposite at 10 mV s$^{-1}$ scan rate, according to certain embodiments.
Figure 12B:
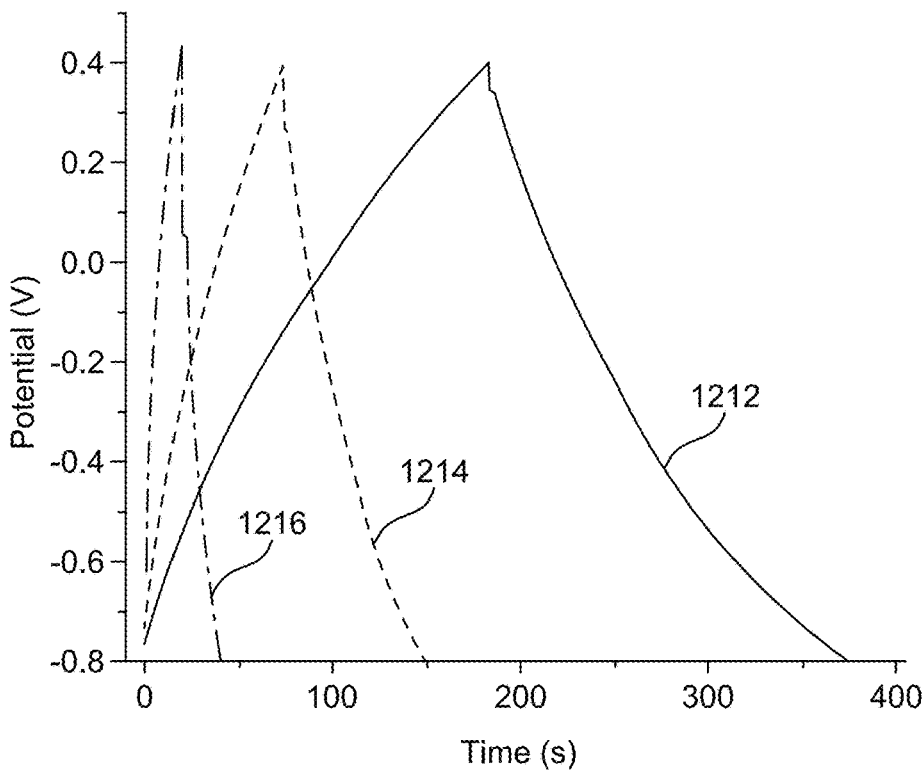
FIG. 12B shows GCD of the supercapacitor fabricated with (CoFe$_2$O/(NiSc$_{0.03}$Fe$_{1.97}$O$_4$)$_2$) nanocrystals, in the extended potential window at different current densities, according to certain embodiments.
Figure 12C:
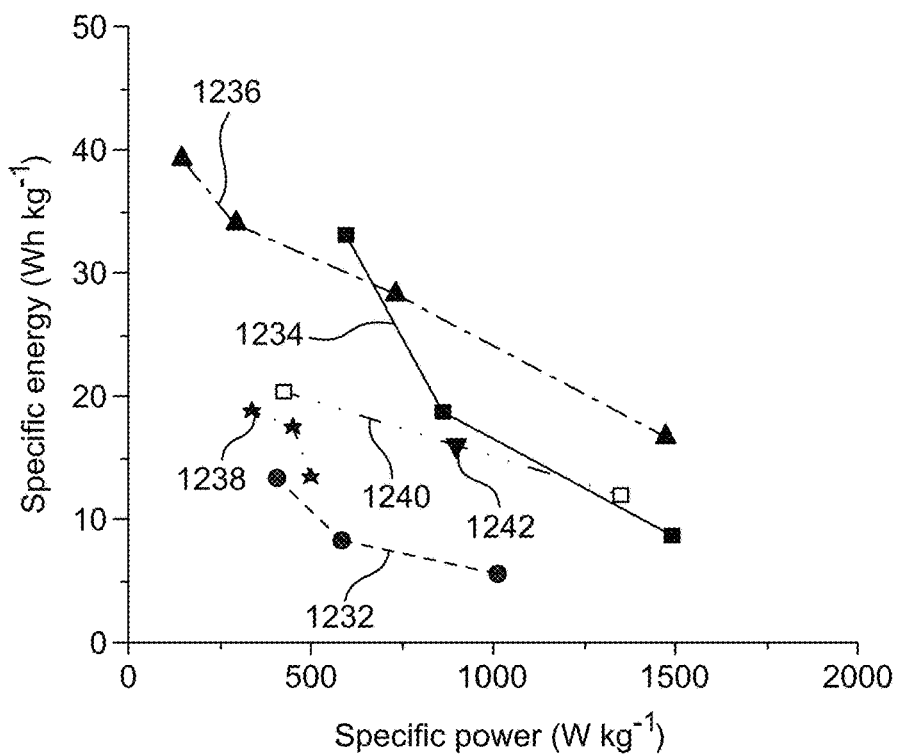
FIG. 12C is a Ragone plot of the supercapacitor fabricated with (CoFe$_2$O/(NiSc$_{0.03}$Fe$_{1.97}$O$_4$)$_2$) nanocrystals, at two different potential windows in comparison with previously reported values, according to certain embodiments.
Figure 12D:
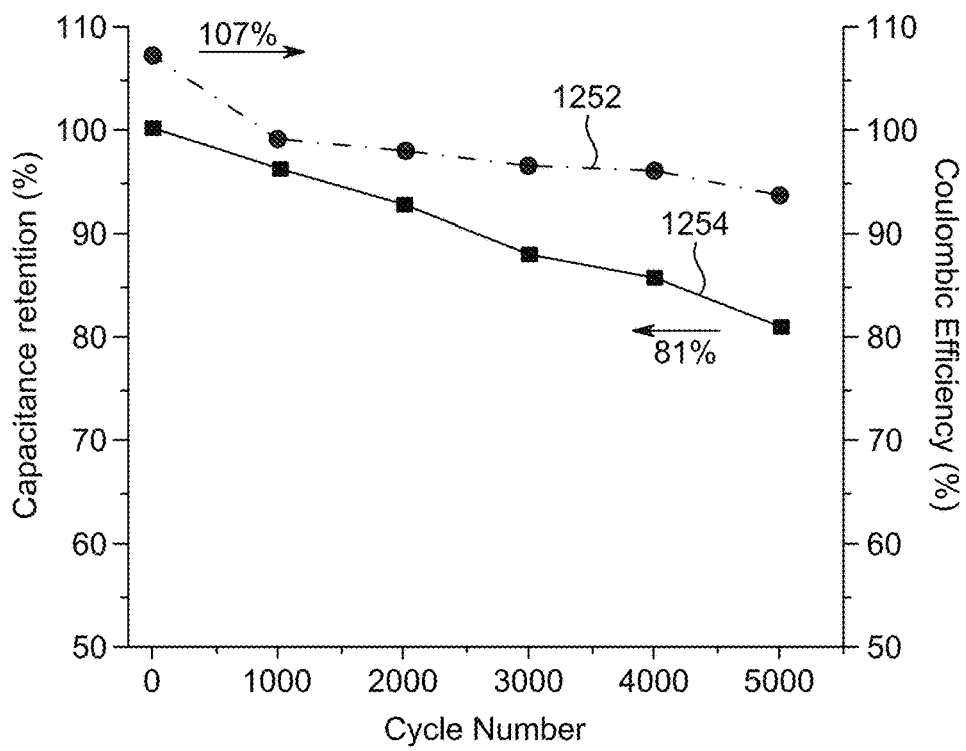
FIG. 12D is a plot depicting the stability and coulombic efficiency of the supercapacitor fabricated with (CoFe$_2$O$_4$/ (NiSc$_{0.03}$Fe$_{1.97}$O$_4$)$_2$) nanocrystals, according to certain embodiments.

The fabricated magnetic supercapacitor for x=2 concentration is tested for different potential windows of 0.8 V (1202), 1.0 V (1204), and 1.2 V (1206) at a scan rate of 10 mV s$^{-1}$ and presented in FIG. 12A. The potential window of 1.2 V was selected for further analysis, including GCD, Ragone plot, and cycling stability. GCD analysis of the same device in the potential window of 1.2 V at a current density of 1 A g$^{-1}$ (1212), 1.5 A g$^{-1}$ (1214), and 2.5 A g$^{-1}$ (1216). The results indicate that no distortion in the charge-discharge profile was observed at 1 A g$^{-1}$ (1212) and that the supercapacitor presents excellent coulombic efficiency, as shown in FIG. 12B. The same GCD data was used to calculate the device's specific energy and specific power and illustrated in FIG. 12C compared to the same device working in the potential window of 0.8 V (1232). The specific energy value was 33.2 W·h kg$^{-1}$ corresponding to a specific power of 596 W kg$^{-1}$. The specific energy values in both potential windows (i.e., 0.8 V and 1.2 V (1234)) are higher than that of the reference carbon supercapacitor (1236, 1238, 1240, 1242), which is 11.5 W·h kg$^{-1}$. This enhancement is attributed to the addition of metal ferrites to the carbon system that introduced pseudocapacitive behavior through a faradaic reaction at the electrode-electrolyte interface. The stability of the device was also tested for various charge-discharge cycles (up to 5000 cycles) in the high potential window of 1.2 V. The capacitance retention and coulombic efficiency were calculated after every 1000 cycles and presented in FIG. 12D. The device showed excellent coulombic efficiency of 94% even after 5000 cycles (1252). Moreover, the stability of the device was verified through capacitance retention calculation, where the device maintains more than 90% of its initial capacitance after 2000 cycles and more than 80% retention after 5000 cycles (1254).

Numerous modifications and variations of the present disclosure are possible in light of the above teachings. Therefore, it is to be understood that within the scope of the appended claims, the invention may be practiced otherwise than as specifically described herein.

The invention claimed is:

1. A method of making a scandium metal-doped nanoparticle, comprising:
    mixing a cobalt salt, an iron salt, and an acid in water to form a solution comprising $CoFe_2O_4$;
    mixing a nickel-iron oxide solution and a scandium oxide solution to form a solution comprising $NiSc_{0.03}Fe_{1.97}O_4$;
    mixing the cobalt iron oxide solution and the nickel scandium iron oxide solution to form a sol-gel mixture comprising $CoFe_2O_4/(NiSc_{0.03}Fe_{1.97}O_4)_x$ (0≤x≤5);
    adjusting the pH of the sol-gel mixture 6 to 8 with a base to form a first mixture;
    heating the first mixture to form a powder; and
    calcining the powder to form the scandium metal-doped nanoparticle of formula $CoFe_2O_4/(NiSc_{0.03}Fe_{1.97}O_4)$, (0≤x≤5),
    wherein the scandium metal-doped nanoparticle has a substantially spherical shape, an average size of 5-200 nm, and is in an aggregate form having a size of at least 20 nm.

2. The method of claim 1, wherein the scandium metal-doped nanoparticle comprises 15-30 wt. % oxygen, 0.1-2 wt. % scandium, 35-45 wt. % iron, 12-25 wt. % cobalt, and 12-25 wt. % nickel, based on the total weight of the oxygen, scandium, iron, cobalt, and nickel.

3. The method of claim 1, wherein the first mixture is heated at 100 to 450° C.

4. The method of claim 1, wherein the powder is calcined at 700 to 950° C. for 3 to 10 hours.

5. A method of making an electrode, comprising:
    mixing a cobalt salt, an iron salt, and an acid in water to form a solution comprising $CoFe_2O_4$;
    mixing a nickel-iron oxide solution and a scandium oxide solution to form a solution comprising $NiSc_{0.03}Fe_{1.97}O_4$;
    mixing the cobalt iron oxide solution and the nickel scandium iron oxide solution to form a sol-gel mixture comprising $CoFe_2O_4/(NiSc_{0.03}Fe_{1.97}O_4)_x$ (0≤x≤5);
    adjusting the pH of the sol-gel mixture 6 to 8 with a base to form a first mixture;

heating the first mixture to form a powder; and calcining the powder to form scandium metal-doped nanoparticles of formula $CoFe_2O_4/(NiSc_{0.03}Fe_{1.97}O_4)_x$ $(0 \leq x \leq 5)$, mixing a binding compound and a carbonaceous compound to form a paste;

adding 1-20 wt. % of the scandium metal-doped nanoparticles, based on the total weight of the binding compound, the carbonaceous compound, and the scandium metal-doped nanoparticles, into the paste and sonicating to form a mixture;

coating the mixture onto a substrate to form the electrode; and drying the electrode at a temperature less than 100° C.

\* \* \* \* \*